(12) United States Patent
Klausing et al.

(10) Patent No.: US 9,480,962 B2
(45) Date of Patent: Nov. 1, 2016

(54) MODULAR CASSETTE SYNTHESIS UNIT

(71) Applicant: CARDINAL HEALTH 414, LLC, Dublin, OH (US)

(72) Inventors: Thomas Alan Klausing, Powell, OH (US); Brian Charles Kelley, Pataskala, OH (US); Joseph Edward Zambanini, Delaware, OH (US); David Arthur Holley, Lancaster, OH (US); Jeffrey Taylor Stroup, Upper Arlington, OH (US); Mehmet Husnu, Phoenix, AZ (US); Dennis Eshima, Phoenix, AZ (US)

(73) Assignee: Cardinal Health 414, LLC, Dublin, OH (US)

( * ) Notice: Subject to any disclaimer, the term of this patent is extended or adjusted under 35 U.S.C. 154(b) by 0 days.

(21) Appl. No.: 14/635,343

(22) Filed: Mar. 2, 2015

(65) Prior Publication Data

US 2016/0001246 A1    Jan. 7, 2016

Related U.S. Application Data

(63) Continuation of application No. 13/550,026, filed on Jul. 16, 2012, now abandoned.

(60) Provisional application No. 61/508,373, filed on Jul. 15, 2011, provisional application No. 61/508,294, filed on Jul. 15, 2011, provisional application No. 61/508,359, filed on Jul. 15, 2011.

(51) Int. Cl.
    *B01J 19/00*    (2006.01)
    *G05B 15/02*    (2006.01)

(52) U.S. Cl.
    CPC ........... *B01J 19/004* (2013.01); *B01J 19/0093* (2013.01); *G05B 15/02* (2013.01); *B01J 2219/0002* (2013.01); *B01J 2219/00006* (2013.01)

(58) Field of Classification Search
    CPC ............... B01J 19/004; B01J 19/0093; B01J 2219/00006; B01J 2219/0002
    USPC .................................................. 422/110, 159
    See application file for complete search history.

(56) References Cited

U.S. PATENT DOCUMENTS

| 3,959,172 A | 5/1976 | Brownell et al. |
| 4,754,786 A | 7/1988 | Roberts |

(Continued)

FOREIGN PATENT DOCUMENTS

| CN | 101603929 A | 12/2009 |
| EP | 2059443 B1 | 11/2010 |

(Continued)

OTHER PUBLICATIONS

Blaine R. Copenheaver, Invitation to Pay Additional Fees and, Where Applicable, Protest Fee Issued in International Application No. PCT/US2012/054229, mailed Nov. 2, 2012, 2 pages.

(Continued)

*Primary Examiner* — Lessanework Seifu
(74) *Attorney, Agent, or Firm* — Amanda F. Maharaj

(57) ABSTRACT

Compact modular cassette systems and methods for the synthesis of radiopharmaceutical products are provided, the compact modular cassette system including a modular unit having valve plates, a reaction cassette, a reagent pack, and other seal and connector plates to ensure that reagents can be mixed together inside one or more chambers of the reaction cassette in a timely and efficient manner. When a new chamber for each new reaction or process should be used, a valveless modular system having removable reaction cassettes and the reagent packs may be used. In such a system, the reagent container, the reaction cassette, or both, can be removed from the modular cassette system and discarded after a desired reaction or process has taken place.

30 Claims, 15 Drawing Sheets

(56) References Cited

U.S. PATENT DOCUMENTS

| | | |
|---|---|---|
| 4,777,367 A | 10/1988 | Kawasaki et al. |
| 4,794,178 A | 12/1988 | Coenen et al. |
| 4,866,277 A | 9/1989 | Johnson et al. |
| 4,967,811 A | 11/1990 | Digianfilippo et al. |
| 5,029,479 A | 7/1991 | Bryan |
| 5,139,731 A | 8/1992 | Hendry |
| 5,171,132 A | 12/1992 | Miyazaki et al. |
| 5,211,678 A | 5/1993 | Stephenson et al. |
| 5,330,142 A | 7/1994 | Gnau, III |
| 5,356,378 A | 10/1994 | Doan |
| 5,373,844 A | 12/1994 | Smith et al. |
| 5,428,470 A | 6/1995 | Labriola, II |
| 5,429,133 A | 7/1995 | Thurston et al. |
| 5,519,635 A | 5/1996 | Miyake et al. |
| 5,527,473 A | 6/1996 | Ackerman |
| 5,540,081 A | 7/1996 | Takeda et al. |
| 5,580,523 A | 12/1996 | Bard |
| 5,605,251 A | 2/1997 | Retti |
| 5,626,172 A | 5/1997 | Schumacher et al. |
| 5,648,268 A | 7/1997 | Batchelder et al. |
| 5,659,171 A | 8/1997 | Young et al. |
| 5,800,784 A | 9/1998 | Horn |
| 5,866,907 A | 2/1999 | Drukier et al. |
| 5,911,252 A | 6/1999 | Cassel |
| 5,932,178 A | 8/1999 | Yamazaki et al. |
| 5,937,364 A | 8/1999 | Westgard et al. |
| 5,961,458 A | 10/1999 | Carroll |
| 5,989,237 A | 11/1999 | Fowles et al. |
| 6,021,341 A | 2/2000 | Scibilia et al. |
| 6,135,955 A | 10/2000 | Madden et al. |
| 6,172,207 B1 | 1/2001 | Damhaut et al. |
| 6,209,738 B1 | 4/2001 | Jansen et al. |
| 6,227,809 B1 | 5/2001 | Forster et al. |
| 6,236,880 B1 | 5/2001 | Raylman et al. |
| 6,359,952 B1 | 3/2002 | Alvord |
| 6,407,394 B1 | 6/2002 | Borioli et al. |
| 6,484,050 B1 | 11/2002 | Carroll et al. |
| 6,531,705 B2 | 3/2003 | White et al. |
| 6,559,440 B2 | 5/2003 | Yarnall et al. |
| 6,565,815 B1 | 5/2003 | Chang et al. |
| 6,567,492 B2 | 5/2003 | Kiselev et al. |
| 6,599,484 B1 | 7/2003 | Zigler et al. |
| 6,624,425 B2 | 9/2003 | Nisius et al. |
| 6,643,538 B1 | 11/2003 | Majewski et al. |
| 6,644,944 B2 | 11/2003 | Karp |
| 6,658,946 B2 | 12/2003 | Lipscomb et al. |
| 6,771,802 B1 | 8/2004 | Patt et al. |
| 6,787,786 B2 | 9/2004 | Kalas et al. |
| 6,827,095 B2 | 12/2004 | O'Connor et al. |
| 6,828,143 B1 | 12/2004 | Bard |
| 6,845,137 B2 | 1/2005 | Ruth et al. |
| 6,915,823 B2 | 7/2005 | Osborne et al. |
| 6,917,044 B2 | 7/2005 | Amini |
| 6,986,649 B2 | 1/2006 | Dai et al. |
| 6,991,214 B2 | 1/2006 | Richter |
| 7,018,614 B2 | 3/2006 | Kiselev et al. |
| 7,025,323 B2 | 4/2006 | Krulevitch et al. |
| 7,030,399 B2 | 4/2006 | Williamson et al. |
| 7,056,477 B1 | 6/2006 | Schwalbe et al. |
| 7,104,768 B2 | 9/2006 | Richter et al. |
| 7,118,917 B2 | 10/2006 | Bergh et al. |
| 7,127,023 B2 | 10/2006 | Wieland |
| 7,170,072 B2 | 1/2007 | Schwarz et al. |
| 7,172,735 B1 | 2/2007 | Lowe et al. |
| 7,200,198 B2 | 4/2007 | Wieland et al. |
| 7,206,715 B2 | 4/2007 | Vanderveen et al. |
| 7,235,216 B2 | 6/2007 | Kiselev et al. |
| 7,279,676 B2 | 10/2007 | Twomey |
| 7,347,617 B2 | 3/2008 | Pugia et al. |
| 7,378,659 B2 | 5/2008 | Burr et al. |
| 7,418,981 B2 | 9/2008 | Baker et al. |
| 7,419,653 B2 | 9/2008 | Walsh et al. |
| 7,435,392 B2 | 10/2008 | Oberbeck et al. |
| 7,445,650 B2 | 11/2008 | Weil et al. |
| 7,445,926 B2 | 11/2008 | Mathies et al. |
| 7,468,165 B2 | 12/2008 | Oberbeck et al. |
| 7,476,883 B2 | 1/2009 | Nutt |
| 7,485,454 B1 | 2/2009 | Jury et al. |
| 7,512,206 B2 | 3/2009 | Wieland |
| 7,577,228 B2 | 8/2009 | Jackson |
| 7,586,102 B2 | 9/2009 | Mourtada et al. |
| 7,607,641 B1 | 10/2009 | Yuan |
| 7,622,509 B2 | 11/2009 | Tonkovich et al. |
| 7,624,642 B2 | 12/2009 | Romo |
| 7,634,378 B2 | 12/2009 | Kaplit |
| 7,638,059 B2 | 12/2009 | Kim et al. |
| 7,641,860 B2 | 1/2010 | Matteo |
| 7,659,522 B2 | 2/2010 | Kim et al. |
| 7,766,883 B2 | 8/2010 | Reilly et al. |
| 7,829,032 B2 | 11/2010 | Van Dam et al. |
| 7,832,429 B2 | 11/2010 | Young et al. |
| 7,863,035 B2 | 1/2011 | Clemens et al. |
| 7,917,313 B2 | 3/2011 | Ziegler et al. |
| 7,987,726 B2 | 8/2011 | Dannhauer |
| 2001/0055812 A1 | 12/2001 | Mian et al. |
| 2002/0043638 A1 | 4/2002 | Kao et al. |
| 2002/0048536 A1 | 4/2002 | Bergh et al. |
| 2002/0128734 A1 | 9/2002 | Dorsett et al. |
| 2002/0148957 A1 | 10/2002 | Lingren et al. |
| 2003/0007588 A1 | 1/2003 | Kiselev et al. |
| 2003/0034456 A1 | 2/2003 | McGregor |
| 2003/0057381 A1 | 3/2003 | Hirayanagi |
| 2003/0057391 A1 | 3/2003 | Krulevitch et al. |
| 2003/0175947 A1 | 9/2003 | Liu et al. |
| 2003/0194039 A1 | 10/2003 | Kiselev et al. |
| 2004/0022696 A1 | 2/2004 | Zigler et al. |
| 2004/0028573 A1 | 2/2004 | Schmitz et al. |
| 2004/0037739 A1 | 2/2004 | McNeely et al. |
| 2004/0054248 A1 | 3/2004 | Kimchy et al. |
| 2004/0084340 A1 | 5/2004 | Morelle et al. |
| 2004/0120836 A1 | 6/2004 | Dai et al. |
| 2004/0136878 A1 | 7/2004 | Meier et al. |
| 2004/0209354 A1 | 10/2004 | Mathies et al. |
| 2004/0258615 A1 | 12/2004 | Buchanan et al. |
| 2004/0262158 A1 | 12/2004 | Alvord et al. |
| 2005/0072946 A1 | 4/2005 | Studer et al. |
| 2005/0084055 A1 | 4/2005 | Alvord et al. |
| 2005/0147535 A1 | 7/2005 | Shulman et al. |
| 2005/0191184 A1 | 9/2005 | Vinson, Jr. |
| 2005/0232387 A1 | 10/2005 | Padgett et al. |
| 2005/0232861 A1 | 10/2005 | Buchanan et al. |
| 2005/0260130 A1 | 11/2005 | Elmaleh et al. |
| 2006/0004491 A1 | 1/2006 | Welch et al. |
| 2006/0076068 A1 | 4/2006 | Young et al. |
| 2006/0132068 A1 | 6/2006 | Norling et al. |
| 2006/0150385 A1 | 7/2006 | Gilligan et al. |
| 2006/0231519 A1 | 10/2006 | Py et al. |
| 2006/0263293 A1 | 11/2006 | Kolb et al. |
| 2007/0027637 A1 | 2/2007 | Delenstarr et al. |
| 2007/0048217 A1 | 3/2007 | McBride et al. |
| 2007/0217561 A1 | 9/2007 | Wieland et al. |
| 2007/0217963 A1 | 9/2007 | Elizarov et al. |
| 2008/0050283 A1 | 2/2008 | Chou et al. |
| 2008/0064110 A1 | 3/2008 | Elizarov et al. |
| 2008/0122390 A1 | 5/2008 | Lidestri |
| 2008/0123808 A1 | 5/2008 | Caffrey |
| 2008/0171999 A1 | 7/2008 | Baplue et al. |
| 2008/0172024 A1 | 7/2008 | Yow |
| 2008/0177126 A1 | 7/2008 | Tate et al. |
| 2008/0181829 A1 | 7/2008 | Matteo |
| 2008/0233018 A1 | 9/2008 | Van Dam et al. |
| 2008/0233653 A1 | 9/2008 | Hess et al. |
| 2008/0249510 A1 | 10/2008 | Mescher et al. |
| 2008/0277591 A1 | 11/2008 | Shahar et al. |
| 2008/0281090 A1 | 11/2008 | Lee et al. |
| 2009/0005617 A1 | 1/2009 | Maeding et al. |
| 2009/0036668 A1 | 2/2009 | Elizarov et al. |
| 2009/0056822 A1 | 3/2009 | Young et al. |
| 2009/0056861 A1 | 3/2009 | Young et al. |
| 2009/0094940 A1 | 4/2009 | Py |
| 2009/0095635 A1 | 4/2009 | Elizarov et al. |
| 2009/0139310 A1 | 6/2009 | Santiago et al. |
| 2009/0157040 A1 | 6/2009 | Jacobson et al. |
| 2009/0159807 A1 | 6/2009 | Waller |

(56) References Cited

U.S. PATENT DOCUMENTS

| | | | |
|---|---|---|---|
| 2009/0165477 A1 | 7/2009 | Sturken et al. |
| 2009/0181411 A1 | 7/2009 | Battrell et al. |
| 2009/0185955 A1 | 7/2009 | Nellissen |
| 2009/0218520 A1 | 9/2009 | Nutt |
| 2009/0247417 A1 | 10/2009 | Haas et al. |
| 2009/0288497 A1 | 11/2009 | Ziegler et al. |
| 2009/0305431 A1 | 12/2009 | Hodges et al. |
| 2009/0314365 A1 | 12/2009 | McAvoy et al. |
| 2009/0314972 A1 | 12/2009 | McAvoy et al. |
| 2010/0008834 A1 | 1/2010 | Lohf et al. |
| 2010/0101783 A1 | 4/2010 | Vinegar et al. |
| 2010/0145630 A1 | 6/2010 | Ball et al. |
| 2010/0187452 A1 | 7/2010 | Mukaddam et al. |
| 2010/0217011 A1 | 8/2010 | Dinkelborg et al. |
| 2010/0243972 A1 | 9/2010 | Voccia et al. |
| 2010/0286512 A1 | 11/2010 | Dhawale et al. |
| 2010/0304494 A1 | 12/2010 | Tokhtuev et al. |
| 2010/0307616 A1 | 12/2010 | Liou et al. |
| 2011/0003981 A1 | 1/2011 | Hirano et al. |
| 2011/0008215 A1 | 1/2011 | Elizarov et al. |
| 2011/0041935 A1 | 2/2011 | Zhou et al. |
| 2011/0087439 A1 | 4/2011 | Ziegler et al. |
| 2011/0094619 A1 | 4/2011 | Steel et al. |
| 2011/0098465 A1 | 4/2011 | Ball et al. |
| 2011/0126911 A1 | 6/2011 | Kobrin et al. |
| 2011/0150714 A1 | 6/2011 | Elizarov et al. |
| 2011/0178359 A1 | 7/2011 | Hirschman et al. |
| 2012/0074330 A1 | 3/2012 | Bouton et al. |
| 2012/0222774 A1 | 9/2012 | Husnu et al. |
| 2013/0015361 A1 | 1/2013 | Bouton |
| 2013/0018618 A1 | 1/2013 | Eshima et al. |
| 2013/0020727 A1 | 1/2013 | Klausing et al. |
| 2013/0022525 A1 | 1/2013 | Eshima et al. |
| 2013/0023657 A1 | 1/2013 | Klausing et al. |
| 2013/0060017 A1 | 3/2013 | Eshima et al. |
| 2013/0060134 A1 | 3/2013 | Eshima et al. |
| 2013/0102772 A1 | 4/2013 | Eshima et al. |
| 2013/0225903 A1 | 8/2013 | Franci et al. |
| 2014/0229152 A1 | 8/2014 | Chisholm |
| 2014/0238542 A1 | 8/2014 | Kvale |
| 2014/0238950 A1 | 8/2014 | Jackson |
| 2016/0001246 A1 | 1/2016 | Klausing et al. |

FOREIGN PATENT DOCUMENTS

| | | |
|---|---|---|
| WO | WO-9512203 A1 | 5/1995 |
| WO | WO-0062919 A1 | 10/2000 |
| WO | WO-0233296 A2 | 4/2002 |
| WO | WO-02083210 A1 | 10/2002 |
| WO | WO-2005025519 A2 | 3/2005 |
| WO | WO-2007041486 A2 | 4/2007 |
| WO | WO-2008028260 A2 | 3/2008 |
| WO | WO-2008083313 A2 | 7/2008 |
| WO | WO-2008101305 A1 | 8/2008 |
| WO | WO-2008128306 A1 | 10/2008 |
| WO | WO-2009003251 A1 | 1/2009 |
| WO | WO-2010072342 A2 | 7/2010 |
| WO | WO-2012061353 A1 | 5/2012 |
| WO | WO-2013066779 A1 | 5/2013 |
| WO | WO-2014105951 A1 | 7/2014 |
| WO | WO-2014105971 A1 | 7/2014 |
| WO | WO-2015101542 A1 | 7/2015 |

OTHER PUBLICATIONS

Bubble column reactor. Wikipedia, last Modified on Oct. 26, 2010, accessed on May 4, 2011, 1 page.

GE Medical Systems Benelux s.a., "TRACERlab MX FDG," Operator Manual, Technical Publications, Direction 2335255-100, Version 1, Last updated: Mar. 2003, pp. 1-61.

Gomzina et al., "Optimization of Automated Synthesis of 2-[18F] Fluoro-2-deoxy-D-glucose Involving Base Hydrolysis", Radiochemistry, 2002, vol. 44 (4), pp. 403-409.

Ido et al., "Labeled 2-deoxy-D-glucose analogs. 18F-labeled 2-deoxy-2-fluoro-D-glucose, 2-deoxy-2-fluoro-D-mannose and 14C-2-deoxy-2-fluoro-D-glucose." Journal of Labelled Compounds and Radiopharmaceuticals, 1978, vol. 14 (2), pp. 175-183.

International Search Report and Written Opinion for International Application No. PCT/US2011/067650, mailed May 1, 2012, 12 pages.

International Search Report and Written Opinion for International Application No. PCT/US2012/046910, mailed Sep. 28, 2012, 9 pages.

International Search Report and Written Opinion for International Application No. PCT/US2012/046933, mailed Feb. 11, 2013, 12 pages.

International Search Report and Written Opinion for International Application No. PCT/US2012/046943, mailed Sep. 28, 2012, 7 pages.

International Search Report and Written Opinion for International Application No. PCT/US2012/046955, mailed Dec. 7, 2012, 11 pages.

International Search Report and Written Opinion for International Application No. PCT/US2012/046968, mailed Oct. 2, 2012, 14 pages.

International Search Report and Written Opinion for International Application No. PCT/US2012/054229, mailed Dec. 31, 2012, 11 pages.

Jill Warden, International Preliminary Report on Patentability Issued in International Application No. PCT/US2012/046933, mailed Jul. 18, 2014, 25 pages.

Lee W. Young, Invitation to Pay Additional Fees and, Where Applicable, Protest Fee Issued in International Application No. PCT/US2012/046933, mailed Dec. 3, 2012, 2 pages.

MacDonald, L.R. et al., "Effects of Detector Thickness on Geometric Sensitivity and Event Positioning Errors in the Rectangular PET/X Scanner," IEEE Transactions on Nuclear Science, 2013, vol. 60 (5), pp. 3242-3252.

Morelle J.L., et al., "Mini-fluidic chip for the total synthesis of PET tracers," TRASIS, 2009, 6 pages.

Muehllenhner, "Effect of Crystal Thickness on Scintillation Camera Performance." Journal of Nuclear Medicine, 1979, vol. 20 (9), pp. 992-994.

Pacak et al., "Synthesis of 2-Deoxy-2-fluoro-D-glucose." Journal of the Chemical Society D: Chemical Communications, 1969, Issue 2, p. 77.

Peng et al., "Design study of a high-resolution breast-dedicated PET system built from cadmium zinc telluride detectors." Physics in Medicine and Biology, 2010, vol. 55 (9), pp. 2761-2788.

Project Fact Sheet, Lab-on-a-chip Implementation of Production Processes for new Molecular Imaging Agents. Universite De Liege. http://cordis.europa.eu/fetch?CALLER=FP6_PROJ&ACTION=D &RCN=75854&DOC=1. Last updated on Dec. 8, 2009, Accessed on May 12, 2010, 2 pages.

Trasis S.A., "A solution for the preparation of unit doses of PET and SPECT radiopharmaceuticals." http://www.rsllabin.com/TRASIS-DISPENSER.pdf. Revision date Oct. 2009, 8 pages.

Vinke et al., "Thick monolithic scintillation crystals for TOF-PET with depth-of-interaction measurement." IEEE Nuclear Science Symposium Conference Record, Oct. 30, 2010-Nov. 6, 2010, pp. 1981-1984.

Wessmann S. et al., "Preparation of highly reactive [18F] fluoride without any evaporation step," Journal of Nuclear Medicine, 2011, vol. 52 (76), pp. 1-2.

Brettschneider F., et al., "Replacement of Acetonitrile by Ethanol as Solvent in Reversed Phase Chromatography of Biomolecules", Journal of Chromatography B, 2010, vol. 878 (9-10), pp. 763-768.

Hamacher K., et al., "Efficient Stereospecific Synthesis of No-Carrier-Added 2-[18]-Fiuoro-2-Deoxy-D-Giucose using Aminopolyether Supported Nucleophilic Substitution" The Journal of Nuclear Medicine, 1988, vol. 27 (2), pp. 235-238.

MODULAR CASSETTE SYNTHESIS UNIT

This application is a continuation application of U.S. patent application Ser. No. 13/550,026 filed on Jul. 16, 2012, titled "MODULAR CASSETTE SYNTHETSIS UNIT", which claims priority to U.S. Provisional Patent Application No. 61/508,373 filed on Jul. 15, 2011, titled "Modular Cassette Synthesis Unit"; U.S. Provisional Patent Application No. 61/508,294 filed on Jul. 15, 2011, titled "Systems, Methods, and Devices for Producing, Manufacturing, and Control of Radiopharmaceuticals-Full"; and U.S. Provisional Patent Application No. 61/508,359 filed on Jul. 15, 2011, titled "Cassette Reaction Vessel Using a Cascade of Valveless Pressure Pumps." Each of the above applications is incorporated by reference herein in its entirety.

BACKGROUND OF THE INVENTION

1. Field of Invention

Aspects of the present invention relate to methods and systems for reagent interaction in a modular context. More specifically, aspects of the present invention relate to methods and systems that effectuate and control reagent interaction through the remote action of pneumatic valves in a modular context.

2. Background

Nuclear medicine is a branch of medical imaging that uses small amounts of radioactive materials to diagnose or treat a variety of diseases, including many types of cancers, heart disease, and other abnormalities within the body. For example, positive emission tomography (PET) is a type of nuclear medicine imaging in which a radiopharmaceutical that includes a radionuclide tracer is introduced into the body where it eventually accumulates in an organ or area of the body being examined. The radionuclide gives off energy in the form of POSITRONS, which are detected by devices, including a PET scanner. In PET, radiopharmaceuticals that incorporate the radionuclide fluorine-18, such as fluorodeoxyglucose (FDG), 3'-deoxy-3'[$^{18}$F]-fluorothymidine (FLT), [$^{18}$F]-fluoromisonidazol (F-MISO), (4-[$^{18}$F]-fluorobenzoyl) norbiotinamide (FBB) and PET Perfusion Agents (PPA), are commonly used.

Due to the radioactive nature of radiopharmaceuticals, special consideration must be taken in their preparation, handling, and delivery. Production of fluorine-18 for use in a radiopharmaceutical is often difficult and/or expensive, requiring specialized equipment, such as a cyclotron. The production of the radioisotope often occurs at a remote facility by a third party, from which the hospital or lab receives patient doses that are ready to inject. Even if the radioisotope happens to be produced on site, final production of the radiopharmaceuticals used in many diagnostic imaging procedures requires manual preparation in a special aseptic environment to ensure a safe injectable product that is free of environmental contaminants. In addition, precise accounting of the radioactive nature of the radionuclide to be used in the radiopharmaceutical for each procedure is required, while taking into account that the bulk radionuclide product continuously decays over time.

Furthermore, during preparation of radiopharmaceuticals, technicians must be shielded from the ionizing radiation of the radionuclide, and the purity of the radiopharmaceutical must be ensured by filtering and/or avoiding contamination through contact with particles in the air, on a surface, and/or when mixing with a diluting liquid, for example. In addition, because of the short half-life of the radionuclide, the efficient scheduling of patients, for example, along with a safe and efficient preparation of the radiopharmaceutical by technicians is critical to avoid wasting the prepared bulk product of the radionuclide.

Shielded containment systems for use in combining cyclotron-produced radionuclides with non-radionuclide components to produce radiopharmaceuticals have been developed. There are, however, many drawbacks of these systems. In particular, typically only one radiopharmaceutical may be produced in a production run. After a run, various radionuclide raw material components and physical system components must be replaced or decontaminated, which can greatly delay the production process and/or make the process much less efficient. Further, many aspects of production of radiopharmaceuticals in such related art systems are not automated and/or may require time-consuming and/or awkwardly controllable hand production steps. In addition, the radioactivity and/or quantities of the raw radionuclide and/or the produced radiopharmaceutical may be inaccurate and/or difficult to determine precisely. Necessary quality control to be performed on the output radiopharmaceutical products may be time-consuming, inaccurate, and/or require high levels of worker input/skill, further hampering production and/or timely delivery of the produced radiopharmaceuticals.

In addition, to carry out a process in which chemical reactions between a variety of reagents are to take place, such as in the production of radiopharmaceuticals, a large and complex setup is sometimes needed to channel liquids, reagents and/or compounds towards a reactor vessel. Channeling various ingredients towards the reactor vessel generally involves the use of tubing, threaded connectors, waiving and the like, which are often a source of fluid losses due to fluid being retained or trapped therein. The uncertainty and un-repeatability of such losses can create errors in determining the respective amounts of ingredients necessary to complete a desired reaction process with a desired specific yield. Moreover, some ingredients or reagents may have a short shelf life and may have to be used very quickly after manufacture or after exposure to the environment, which further increases the need for complex reaction vessels.

Accordingly, there is a need in the art for systems and methods that provide for chemical and/or physical interactions between a plurality of reagents and ingredients, while reducing or eliminating the need for excessive connections, tubing, and the like, particularly for the synthesis of chemical compounds such as, for example, radiopharmaceutical products, that are typically used in small quantities and that utilize reagents having a short shelf life. For example, the radioactive input may be a radioactive isotope typically produced in a cyclotron. There is a further need in the art for methods and systems that provide for chemical and/or physical interactions between a plurality of reagents and ingredients, while ensuring that subsequent reactions are not contaminated by remnants from previous reactions by providing, for example, one or more disposable reaction modules. There is a further need in the art for methods and systems in which one or more reaction modules may be removably connected to one another, as such methods and systems may be useful in providing the ability to quickly and efficiently dispose a plurality of ingredients and/or reagents in contact with each other in a reaction vessel or chamber. There is a further need in the art for systems and methods that provide for chemical and/or physical interactions between a plurality of reagents and ingredients when the reagents have a relatively short lifetime and must be mixed within a short period of time after being manufactured or exposed to the environment.

SUMMARY

In light of the above-described problems and unmet needs, a compact modular cassette system for the synthesis of radiopharmaceutical products may be provided, the compact modular cassette system including a modular unit having valve plates, a reaction cassette, a reagent pack. and other seal and connector plates, to ensure that reagents can be mixed together inside one or more chambers of the reaction cassette in a timely and efficient manner. According to various aspects of the present invention, when it is preferable to use a new chamber for each new reaction or process, a modular system where both the reaction cassette and the reagent pack are removable may be helpful, where either the reagent container, the reaction cassette, or both, can be removed from the modular cassette system and discarded after a desired reaction or process has taken place and, for example, the product of the reaction has been collected or further treated in a subsequent process.

According to various aspects, the physical connection between a reagent pack and the reaction cassette may be provided via one or more corresponding channels etched, molded or machined in at least one of the reagent pack and the reaction cassette. In addition, reagent transfer between a reagent pack and a chamber inside the reaction cassette may be controlled by a module located remotely from both the reagent pack and the reaction cassette, which remains part of the overall modular system. According to additional aspects of the current invention, a broad side or broad face of the reaction cassette may be coupled to a corresponding broad side of the reagent pack or any other module that is part of the overall modular cassette system in order to allow for fluidic connections at various locations between neighboring cassettes, packs and other modules. In addition, e.g., radiation sensors and/or other heating elements may also be coupled to neighboring modules, cassettes or reagent packs. For example, the modular unit may include a number of power and fluid supply devices that are to remain stationary, and accordingly, the removable reaction cassette may be placed at a front end of the overall modular unit to facilitate operator interaction and, for example, to facilitate removal of the cassette to a disposal container. Furthermore, the modular unit may be coupled to the cassette so as to be located behind the cassette, which increases convenience of use of the modular unit when the modular unit includes communication lines coupling the cassette to supply lines located at a back portion of the modular unit.

The module/cassette structure may also allow for an automatic ejection of the cassette. This may be advantageous in reducing operator exposure to the cassette and the hazardous radioactivity within waste droplets remaining within the cassette. The mini cell shielding structure may allow for the ejected cassettes to be guided to a shielded waste collection container. Further, future systems, with further development, may automatically install a fresh replacement cassette.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein.

DETAILED DESCRIPTION OF PREFERRED ASPECTS

These and other features and advantages of this invention are described in, or are apparent from, the following detailed description of various example aspects.

Figure 1:
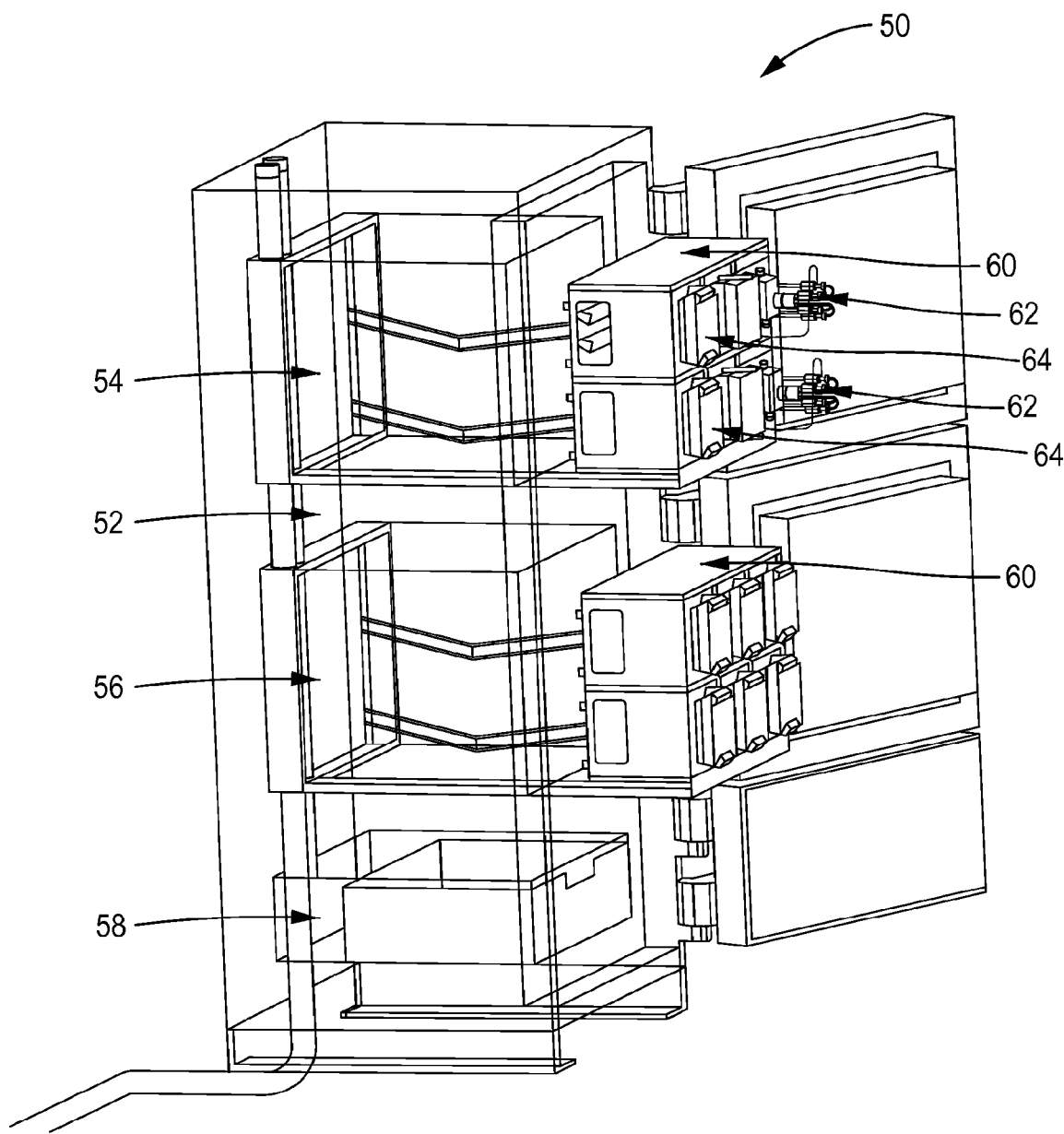
FIG. 1 shows a system for radiopharmaceutical preparation according to an aspect of the invention.

FIG. 1 shows a system for radiopharmaceutical preparation according to an aspect of the invention. The system 50 may include a shielded container, such as a mini-cell 52. The mini-cell 52 may include compartments 54, 56, and 58. Compartments 54 and 56 may each house a framework for mounting specific units, such as multi-synthesis units 60. For example, a multi-synthesis unit 60 may be about 26-30 inches wide, 18-22 inches tall, and 18-24 inches deep. A multi-synthesis unit 60 may be placed on a sliding track, for example, within a compartment so that the multi-synthesis unit 60 can easily be accessed for service or replacement of the modules or their components.

Each multi-synthesis unit 60 may hold any number of modules as can be accommodated, while maintaining the overall compactness of the system 50. In the example shown in FIG. 1, the multi-synthesis units 60 may each incorporate up to six modules. For example, the modules may include, but are not limited to, accessory modules 62 and synthesis modules 64. The components of the modules 62 or 64 may be housed in a container that allows the modules to be removed easily from a multi-synthesis unit 60. A radiopharmaceutical material may be prepared in a synthesis module 64 with reagents provided from the reagent pack. An additional compartment 58 may be used to store waste products of the radiopharmaceuticals synthesis process of the system 50, for example.

Figure 2A:
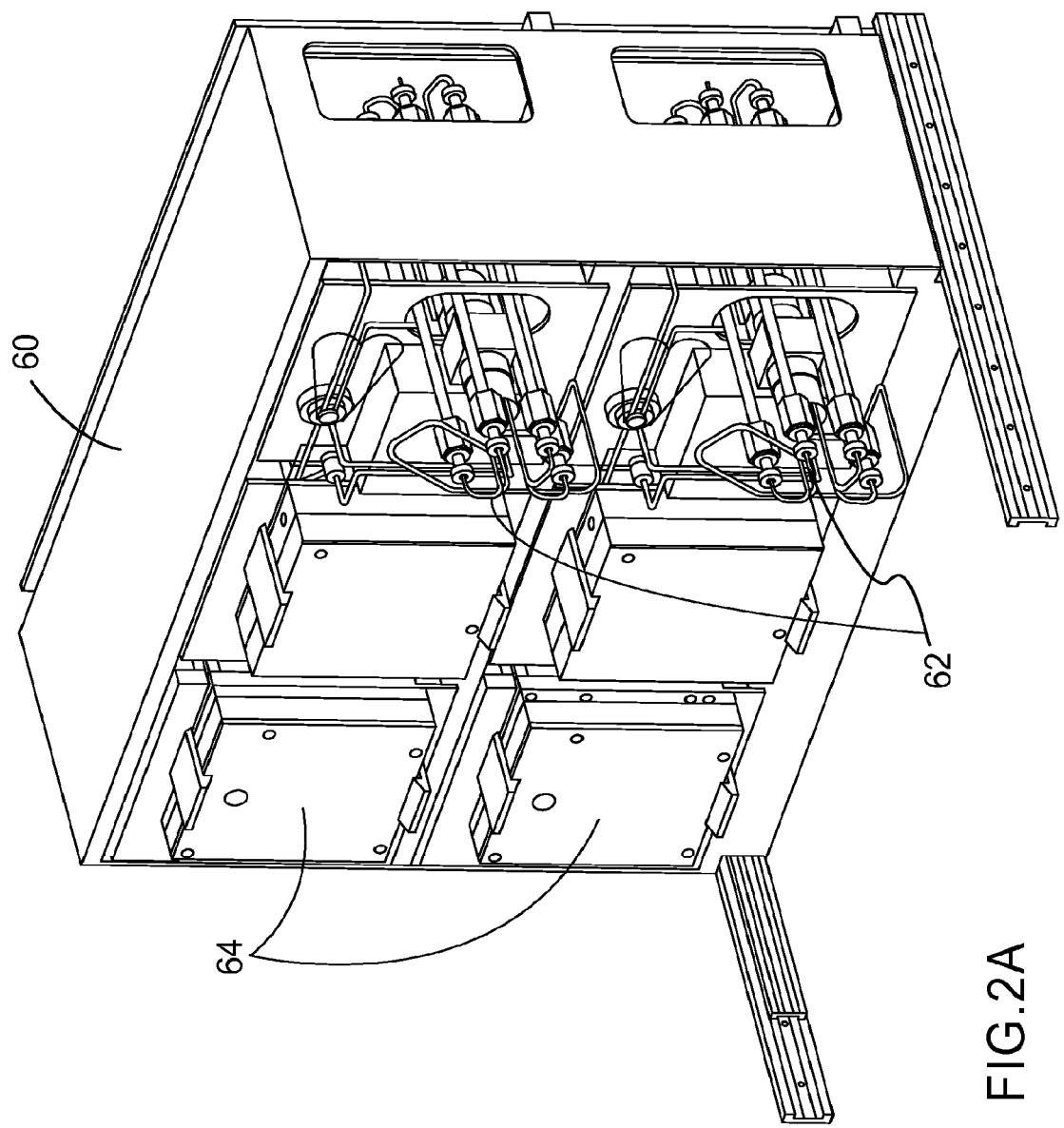
FIGS. 2A-2C show perspective views of a multi-synthesis unit according to an aspect of the invention.
Figure 2B:
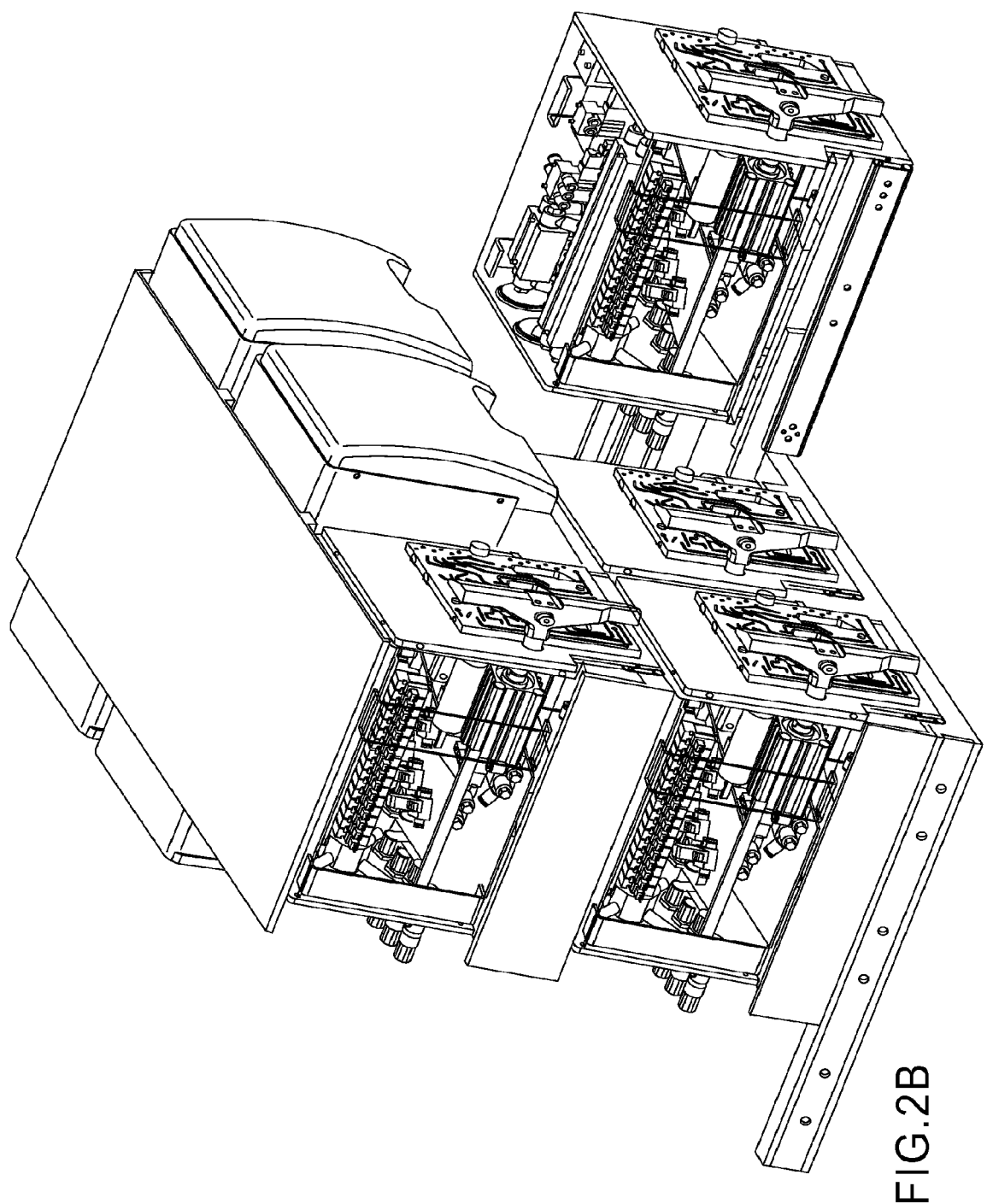
Figure 2C:
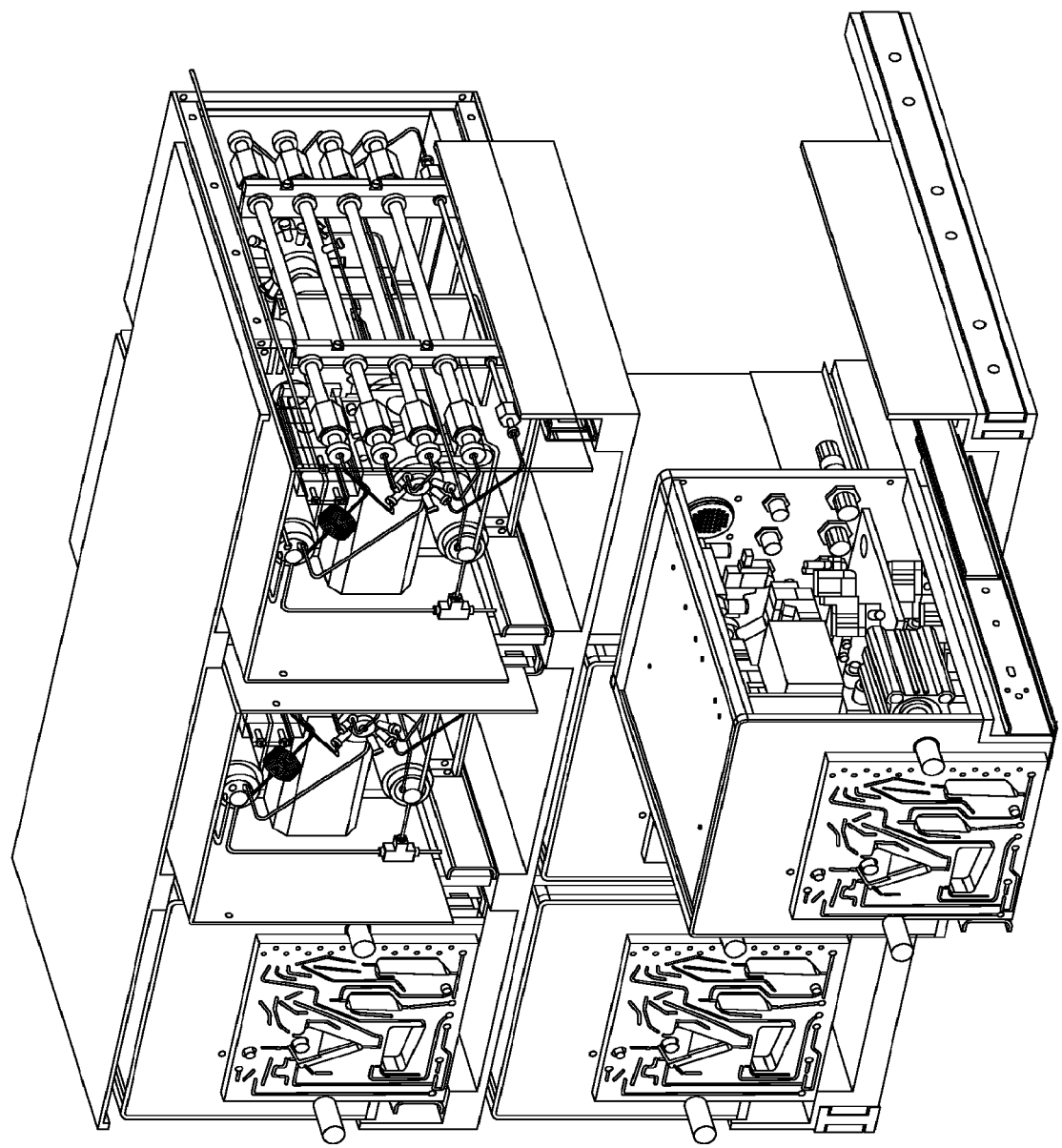

FIG. 2A is a perspective view of a six-module multi-synthesis unit, similar to the multi-synthesis unit 60 discussed in FIG. 1, according to an aspect of the invention. For example, the unit 60 may be sized to fit into a reduced mini-cell volume, and positioned on slides so that it may be pulled forward in, e.g., the mini-cell 52, for service. Further, individual modules 62 or 64 may be pulled forward in the multi-synthesis unit 60 for service or replacement. According to various aspects, quick disconnects and hands-free connections between the modules and a multi-synthesis backplane/bus system (not shown) may be implemented to facilitate rapid module replacement. For example, as shown in FIGS. 2B and 2C, the backplane/bus approach may allow individual modules to slide into the system and through "quick disconnects" tie into utilities to include power, gasses, solvents, control connections and the like. The overall electronics and control package may tie in to this bus and allow the control to be located remotely and shielded away from the sources of radioactivity, which traditionally has created reliability issues. This is due to the failure of electronic components exposed to high levels of radioactivity in traditionally packaged synthesis units combining electronics (controls) and electromechanical components. According to various aspects of the subject invention, package of controls and electronics may be mounted in separate electrical box outside the shielded cell, and the package may be shared among a group of synthesis units (e.g., 6-12 synthesis units). In addition, according to various aspects, a cable management scheme may permit the entire multi-synthesis unit 60 to be pulled forward in the mini-cell for service without disconnecting fluid, gas, and electrical lines from the mini-cell.

Figure 3A:
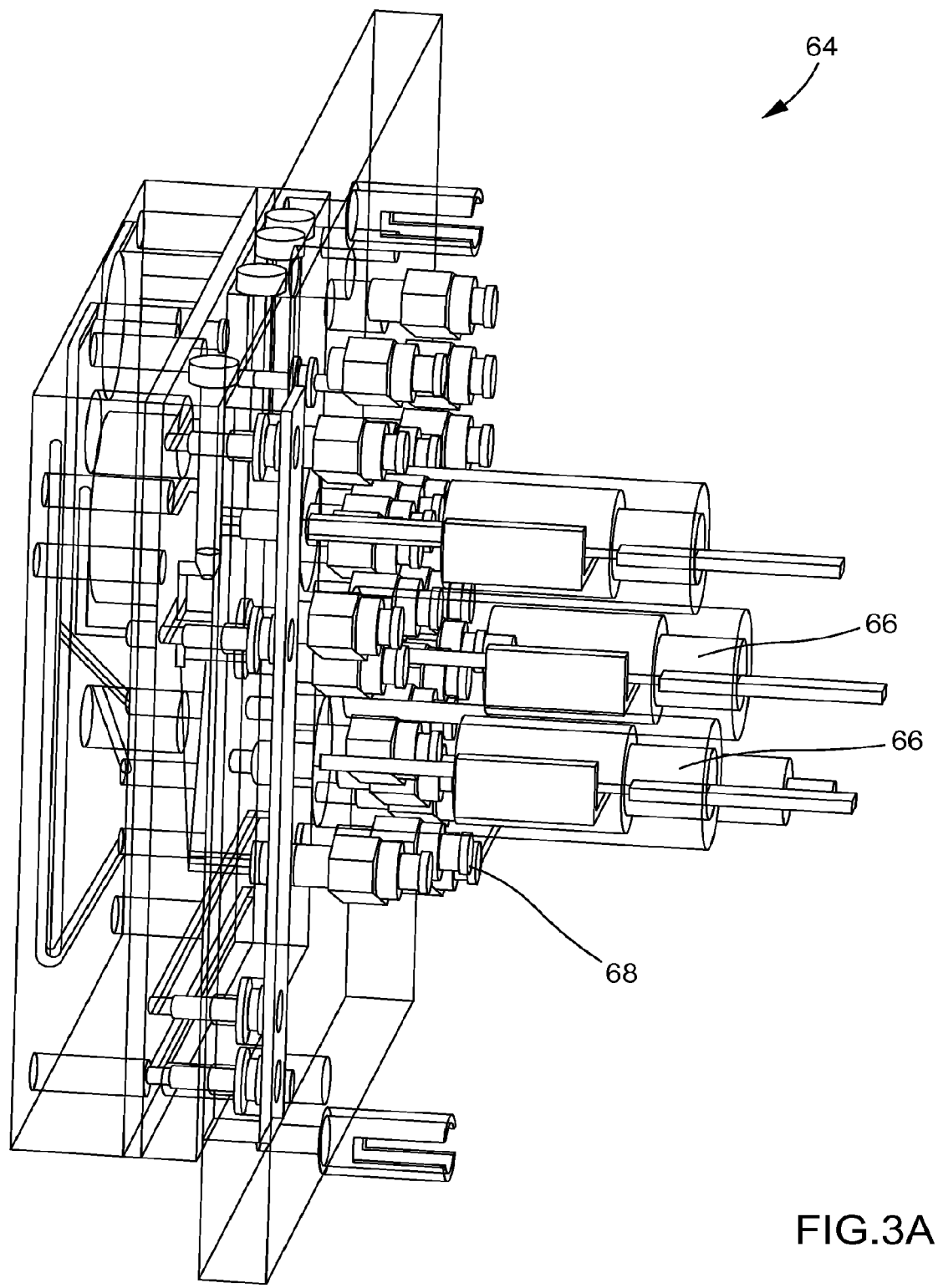
FIGS. 3A-3C show perspective views of a synthesis module according to an aspect of the invention.
Figure 3B:
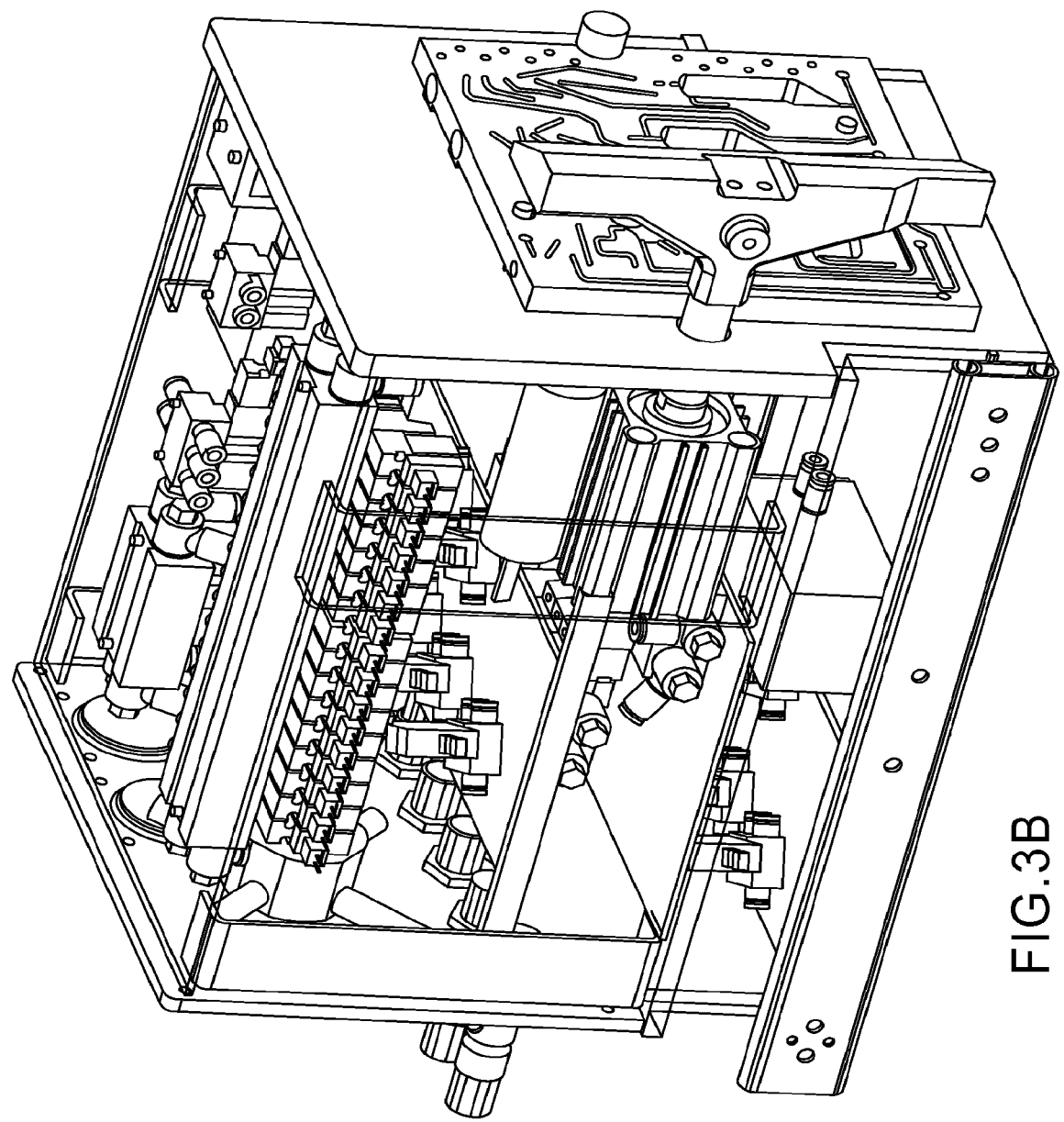
Figure 3C:
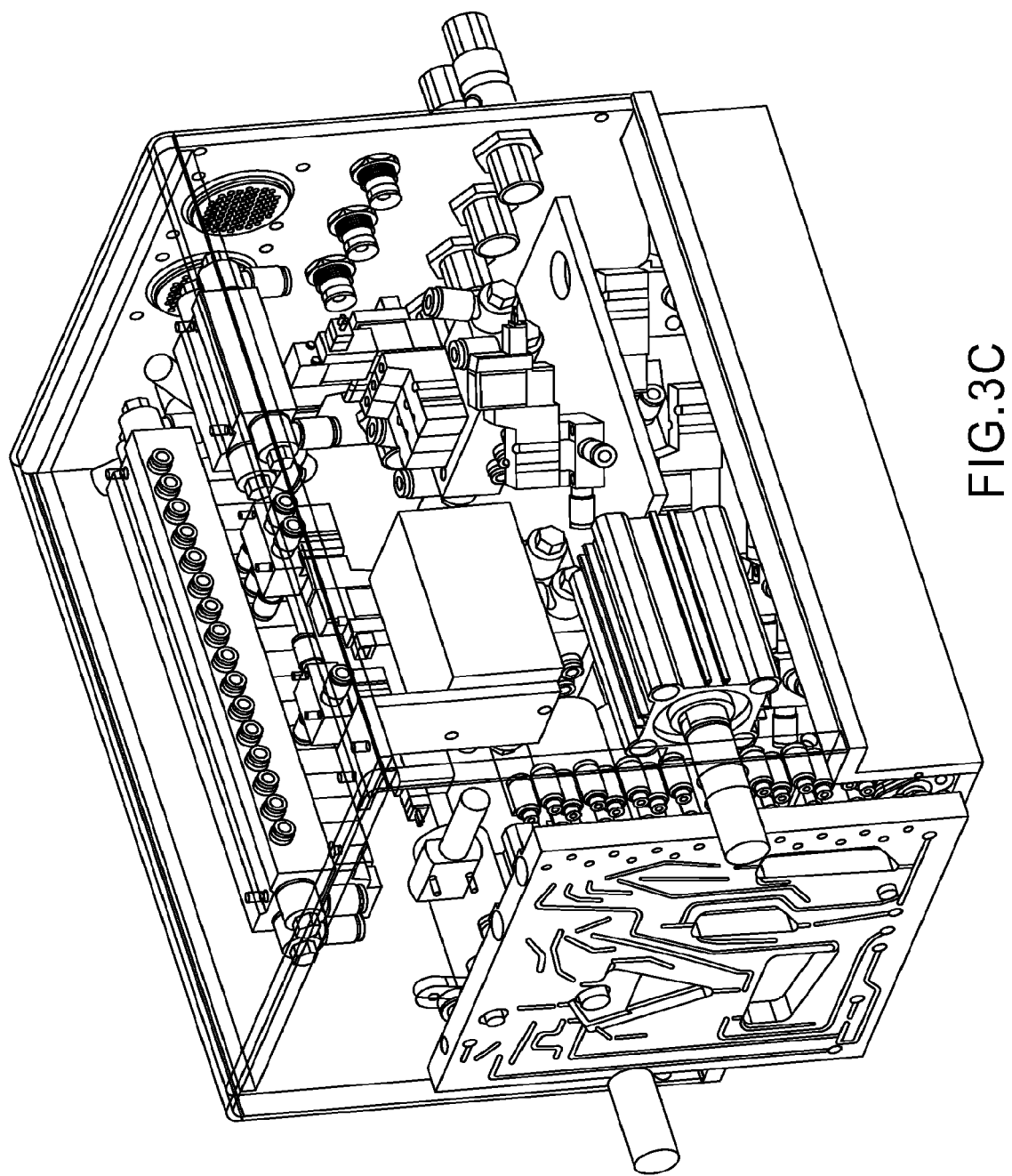

FIGS. 3A-3C show a number of perspective views of a synthesis module, similar to the synthesis module 64 in FIG. 1, according to an aspect of the invention. More specifically, each of the synthesis modules 64 may be configured to include, among other things, a group of radiation detectors 66, fixed air/vacuum connections 68, and floating luer connections (not shown).

Figure 4:
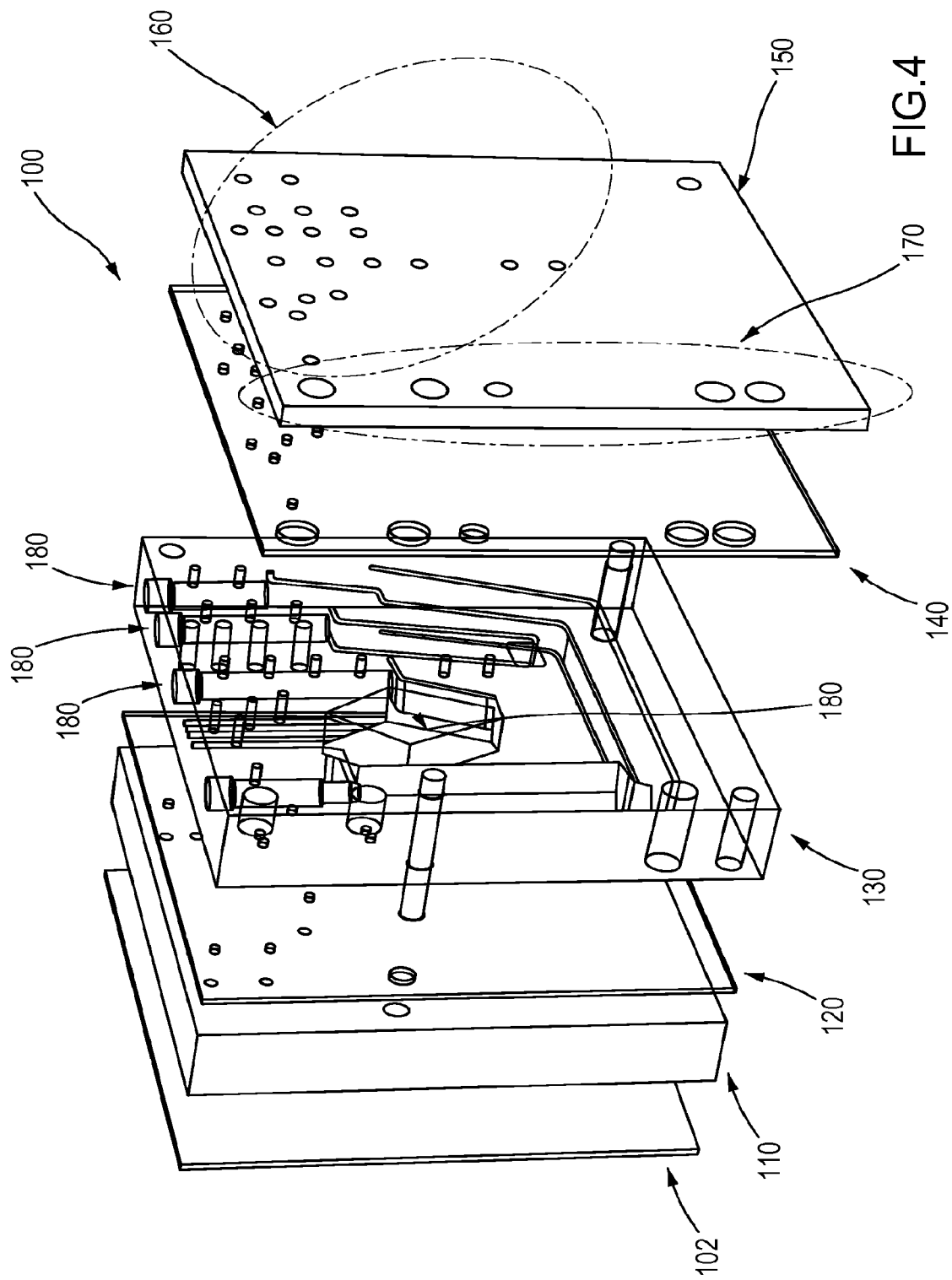
FIG. 4 is a perspective view of a modular cassette system, according to various aspects of the current invention.

FIG. 4 is a perspective view of a valveless modular reaction system 100, according to various aspects of the current invention. In FIG. 2, the system 100 may include a reagent pack 110, a gasket 120 between the reagent pack 110 and a reaction cassette 130. According to various aspects, both the reagent pack 110 and the reaction cassette 130 may be connected to a control interface plate 150 located, e.g., at a back portion of the system 100. In FIG. 4, a membrane 140 is provided between the control interface plate 150 and the reaction cassette 130, while the gasket 120 is provided between the reagent pack 110 and the reaction cassette 130. According to various aspects, the gasket 120 and the membrane 140 may provide, e.g., fluid insulation such as water tightness of the connection between the reagent pack 110 and the reaction cassette 130, and between the reaction cassette 130 and the interface plate 150, respectively. Additionally, the gasket 120 and membrane 140 may be individually used to bond two neighboring cassettes or modules together. The gasket 120 may alternately be comprised of a collection of o-rings instead of a continuous sheet. According to various aspects, the system 100 may be used for the synthesis of chemical compounds such as, for example, radiopharmaceutical products, that are typically used in small quantities and that utilize reagents having a short shelf life. According to various aspects, a reagent cover 102 may be provided to cover and protect the reagent pack 110 from outside environmental factors such as heat, humidity and/or impact.

According to various aspects of the current invention, the cassette 130 may include one or more chambers 180 in which a reaction such as, for example, a synthesis reaction, can take place. The reaction may take place in one or more chamber 180 after reagents included in the reagent pack 110 have been transferred into the chamber 180 to start the reaction. Because the overall system 100 is modular and the reagent pack 110 is a single unit of the overall modular system 100, the reagent pack 110 can be removed independently of the remaining parts or units of the system 100 such as, e.g., the cassette 130, and can be replaced with either another reagent pack having a larger quantity of reagent and/or a different reagent. The reagent pack 110 may contain, for example, specific reagents needed for the processing or synthesis of a specific product.

According to various aspects of the current invention, the reagent pack 110 may be connected to the cassette 130 via one or more supply channels (see, e.g., 320 in FIG. 6) that are constituted by corresponding channels etched or otherwise formed within either or both the cassette 130 and the reagent pack 110 and that are connected to each other via corresponding holes in the gasket 120. Accordingly, a reagent can be transferred from the reagent pack 110 to the cassette 130 through the gasket 120 without having to use a transfer line or other outside transfer device or valve. A more detailed discussion of the connection between the reagent pack 110 and the cassette 130 is provided below in connection with FIG. 8 below. The gasket 120 may be snugly placed between the reagent pack 110 and the cassette 130 to provide insulation and, for example, avoid reagent leakage from the reagent pack 110 and/or from the cassette 130 while allowing an efficient communication between the reagent pack 110 and the cassette 130 to provide for complete, fast, and efficient fluid and/or reagent transfer. For example, when reagents have a short shelf life and must be used within a short period of time after being manufactured or after being exposed to the environment, the reagent pack 110 may be stored separately, and inserted into the system 100 in fluid communication with the cassette 130 immediately or a short time prior to use, as needed.

According to various aspects of the current invention, the cassette 130 may be coupled to the planar-shaped interface plate 150 via the membrane 140 provided therebetween. According to various aspects of the current invention, the interface plate 150 may be connected to the cassette 130 via one or more supply channels (not shown) that are constituted by corresponding channels etched or otherwise formed within either or both the cassette 130 and the interface plate 150 and that connect to each other via corresponding holes in the gasket 140. The gasket 140 may be snugly placed between the interface plate 150 and the cassette 130 to provide insulation and, for example, avoid reagent leakage from the interface plate 150 and/or from the cassette 130 while allowing communication between the interface plate 150 and the cassette 130 to provide for complete, fast, and efficient fluid and/or reagent transfer. According to various aspects, the interface plate 150 may also be in direct fluid communication with the reagent pack 110 via one or more channels that may be formed through the interface plate 150, the gaskets 140 and 120, and/or the cassette 130, but where the channels do not communicate with any chamber 180 of the reaction cassette 130. Accordingly, the reagent in the reagent pack 110 may be directly controlled via the interface plate 150. The interface plate 150 may include a plurality of ports 160, located on an opposite surface of the interface plate 150 to the surface that is in contact with the gasket 140, the plurality of ports 160 being used for gas, vacuum and/or fluid to be pumped in, or out of, one or more chambers 180 of the cassette 130 and/or the reagent pack 110.

According to various aspects, the ports 160 may be used to flow gas such as, for example, pressurized gas, into one or more of the supply channels of the reagent pack 110, or of the cassette 130, or of both the reagent pack 110 and the cassette 130, also in order to induce or prevent the transfer of fluid between the various units of the system 100. According to various aspects, the interface plate 150 may have ports 170 connected to supply or drain lines to allow, for example, supply or drainage of reagent, catalyst, or other needed ingredient. An experimental foundation for the operation of the units of the system 100 to manipulate vacuum and pressurized gas, or pneumatics, to ensure complete and fast transfer of liquid and/or reagents from one unit to the next such as, for example, from the reagent pack 110 to the cassette 130 and/or vice-versa, is described below with reference to FIG. 8.

According to various aspects of the current invention, by manipulating pneumatics via the ports 160, any reagent or combination of reagents and ingredients present in the reagent pack 110 may be completely and rapidly transferred to a chamber 180 of the cassette 130 via one or more of the supply channels connecting the reagent pack 110 and the cassette 130, or between one chamber 180 and another chamber 180, via channels connecting the chambers 180 within the cassette 130. Manipulating the pneumatics between the reagent pack 110 and the cassette 130 via the ports 160 may include, for example, creating a vacuum in a supply channel connecting the reagent pack 110 and the cassette 130 to create a suction effect and transfer a reagent present in the reagent pack 110 into a given chamber 180 of the cassette 130 as a result of that suction effect.

Figure 5:
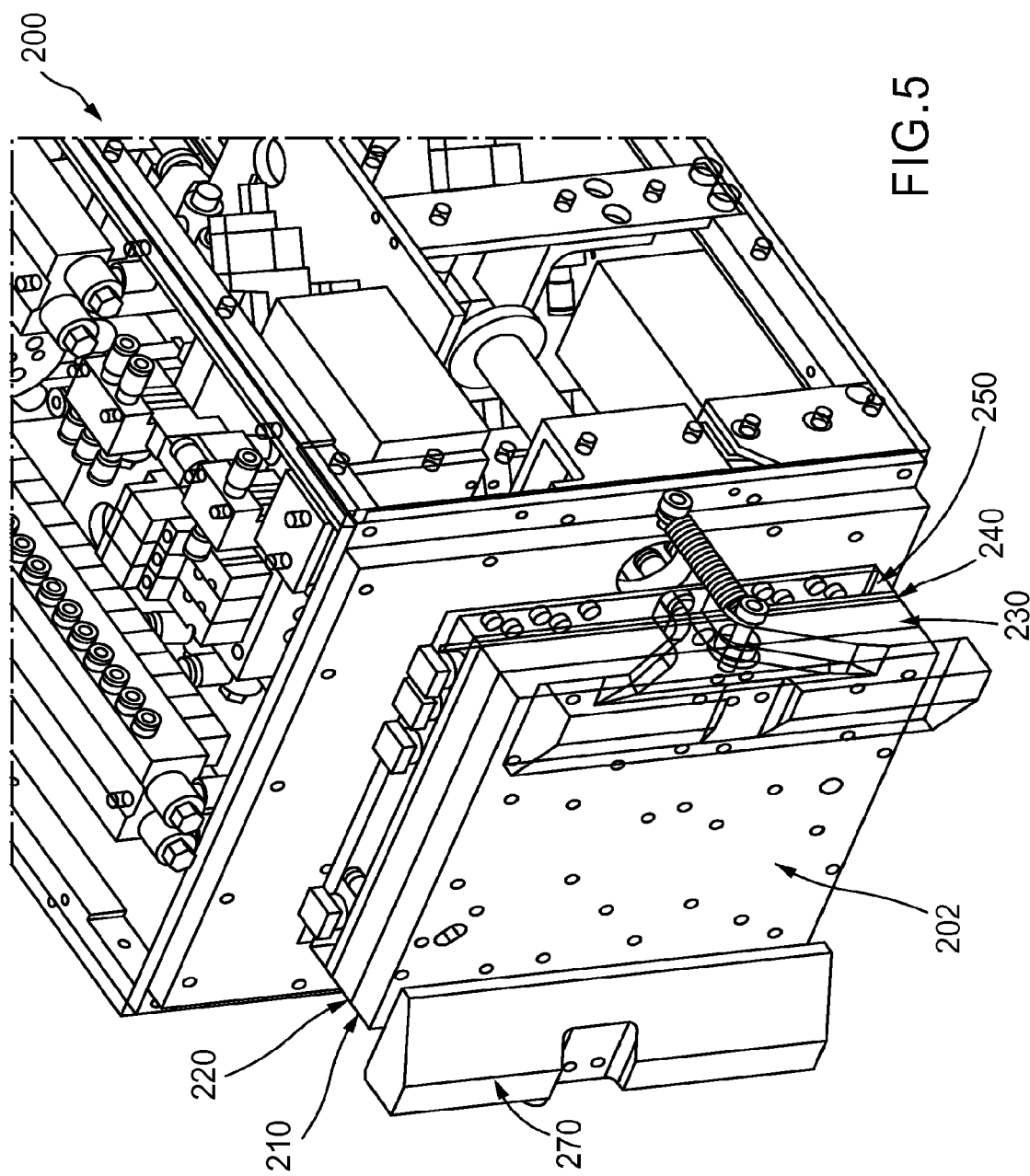
FIG. 5 is a perspective view of a synthesis module, according to various aspects of the current invention.

According to various aspects of the current invention, the reagent pack 110 and one or more chambers 180 of the cassette 130 may be connected to a module such as the module 250 illustrated in FIG. 5 via the ports 160 and one or more channels formed in the cassette 130, in the reagent pack 110, in the interface plate 150 and in the gaskets 120 and 140 in order to allow the flow of gas, such as pressurized gas, and/or vacuum, to the reagent pack 110 or to/from a chamber 180. According to various aspects, in order to ensure a complete transfer of reagent from the reagent pack 110 to a chamber 180, a vacuum may be applied to the chamber 180 through a supply channel connecting the chamber 180 to a vacuum/gas source via one or more of the ports 160 to create a pressure gradient between the chamber 180 and the reagent pack 110, while a flow of pressurized gas may be provided in the reagent pack 110 through a channel connecting the reagent pack 110 to a source of pressurized gas at one or more of the ports 160 of the interface plate 150.

Accordingly, the combined action of pressurized gas urging the reagent in an outward direction from the reagent pack 110 via a channel formed in the reagent pack 110, and the action of the pressure gradient or vacuum created inside the chamber 180 and pulling the reagent into the chamber 180 via a suction effect, may ensure a rapid and complete reagent transfer from the reagent pack 110 to the chamber 180. It should be noted that in order to prevent premature transfer of reagent between the reagent pack 110 and the chamber 180 from occurring, the fluid passages may be pinched off by pneumatic action on the membrane 140, past which the fluid channels are routed. Alternatively, a gas may be provided from the chamber 180 into the reagent pack 110 to keep the reagent in the reagent pack 110 and to prevent the reagent from accidentally discharging outside the reagent pack 110 before an appropriate time. When the transfer of reagent from the reagent pack 110 to the chamber 180 is desired, the flow of gas from the chamber 180 may be discontinued and a pressure gradient, such as a vacuum, may be created as explained below in greater detail in reference to FIG. 8 below.

According to various aspects, when forward flow from the reagent pack 110 to the chamber 180 is desired, a vacuum is created in the module by opening a vacuum valve coupled to a port 160 of the interface plate 150. As a result, a pressure gradient is created in the chamber 180. In addition, pressurized air may be provided to the reagent pack 110 via a port 160 so as to enter the reagent pack 110 from above the fluid level in the reagent pack 110 and to urge the reagent through a channel connecting the reagent pack 110 to the chamber 180 until all the reagent has been transferred from the reagent pack 110 to the chamber 180. According to various aspects, such a transfer is made possible by the combined action of the pressure gradient created in the chamber 180 and the pressurized gas in the reagent pack 110.

According to various aspects, the reagent being transferred from the reagent pack 110 into one or more chambers 180 of the modular cassette 130 may be a radioactive input, and the synthesis of a product, such as a radioactive product, may take place in a chamber 180 of the cassette 130. For example, the radioactive input may be a radioactive isotope typically produced in a cyclotron. According to various aspects, both the cassette 130 and the reagent pack 110 may be disposable. An advantage of the valveless system illustrated in FIG. 4 is the elimination of problems related to losses created by fluid or reagent remaining in valves and other tubing typically used to connect a reactor with a source of reagents.

FIG. 5 is a perspective view of a synthesis module in operation, according to various aspects of the current invention. In FIG. 5, the disposable reaction cassette 230 and the reagent pack 210 are clamped together and held attached to the non-disposable module 250 via the clamping mechanism 270 during use of the system 200. According to various aspects, the clamping mechanism 270 also provides the pressure and cohesive strength necessary to create a leak-free fluid connection between the reagent pack 210 and the cassette 230 by aligning respective channels formed in each of the reagent pack 210 and the cassette 230, as well as provide enough pressure and cohesive strength between the reagent pack 210 and the reaction cassette 230 to allow the gaskets 220 and 240, respectively provided between the reagent pack 210 and the reaction cassette 230, and between the reaction cassette 230 and the module 250, to fulfill their function of providing insulation and preventing leakage of reagent or other ingredients. Accordingly, when the clamping mechanism 270 is in action, the respective channels in the reagent pack 210 and in the cassette 230, as well as the open channels formed in the gaskets 220 and 240, are all aligned so as to create fluid connections between the cassette 230 and the reagent pack 210, as well as between a cover 202, the module 250 and each of the reagent pack 210 and the cassette 230.

Figure 6:
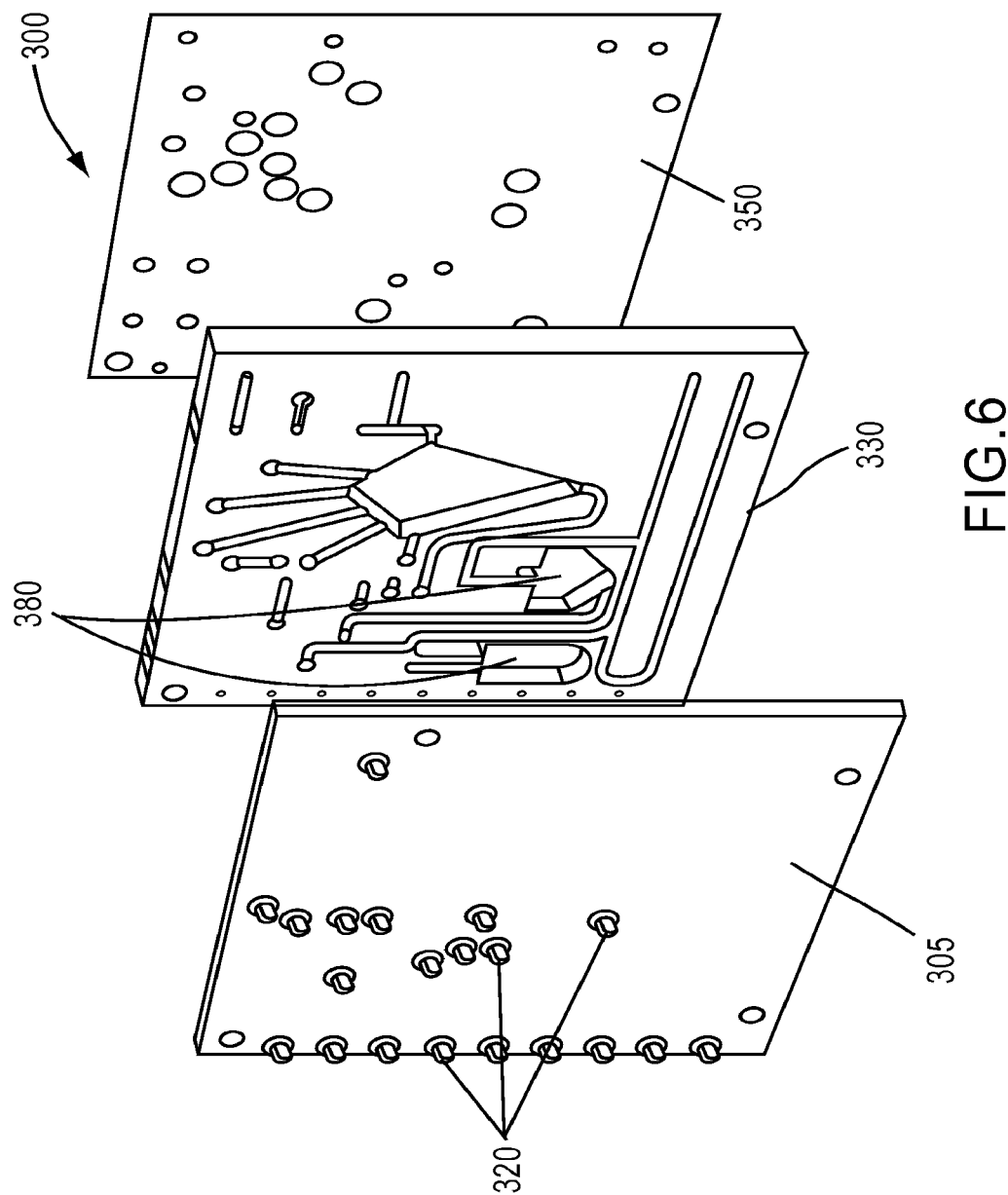
FIGS. 6-7 are perspective views of components of a modular cassette system, according to various aspects of the current invention.
Figure 7:
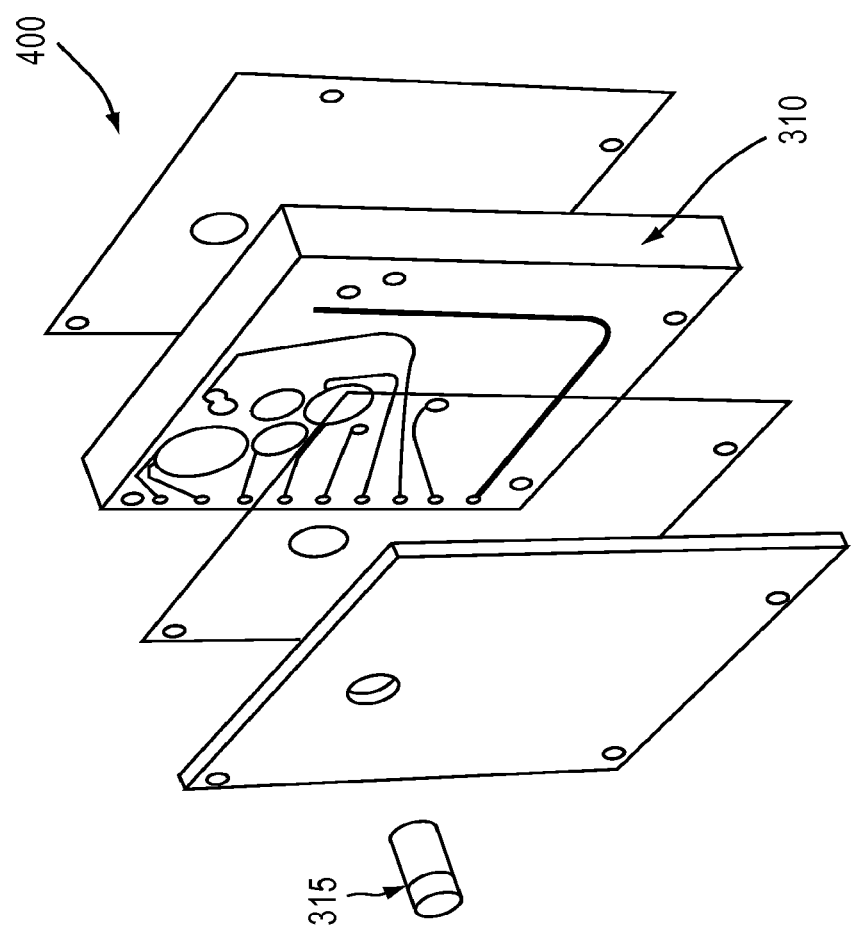

According to various aspects, the removable reagent pack 210 may be covered by a protective cover (not shown) on the surface that is in contact with the gasket 220, the protective cover covering one or more cavities or pockets within the reagent pack where an amount and/or a number of reagents may be stored, as illustrated in FIGS. 6-7 and described below. Accordingly, if the protective cover is punctured, the reagent present in the cavities or pockets is able to be transferred out of the reagent pack 210. Accordingly, the clamping mechanism 270 in one aspect of the system 200 also provides activation of the connections between the various modules by, for example, puncturing the protective cover that may cover the cavities or pockets in the reagent pack 210 in order to allow reagent located inside the cavities or pockets to be delivered to a chamber (not shown) of the cassette 230. The clamping mechanism 270 may also provide sufficient pressure to enable the sealing gaskets to seal the various modules and prevent leakage or outside impurities from penetrating the modular reaction system 200.

According to various aspects, the clamping mechanism 270 may also provide a mechanism to allow for the ejection of the cassette 230 and/or of the reagent pack 210 after use.

According to various aspects of the current invention, in operation, the reagent pack 210, which is initially covered on both surfaces by a protective layer, and which is illustrated in FIGS. 6-7 and described in more detail below, is removeably inserted in the system 200. As discussed above, on the surface that is to be in contact with the cassette 230, the reagent pack 210 may have a protective membrane covering the surface of the reagent pack 210 and keeping the reagent inside the reagent pack 210. According to various aspects, the reagent pack 210 may include a plurality of cavities or pockets in which one or more reagents or ingredients may be stored, where each cavity may have two exits, a fluid exit and a vent. After the reagent pack 210 is inserted in the system 200, the module 250, actuated, may urge the clamping mechanism 270 to clamp the various modules of the system 200, such as the reagent pack 210 and the reaction cassette 230, and to allow tubes to pneumatically puncture portions of the membrane covering one or more pockets in the reagent pack 210 in order to allow the transfer of reagent stored in the one or more of the pockets from the reagent pack 210 to the cassette 230. When the reagent pack 210 is punctured and the stored reagents or ingredients are exposed to the transfer channels connecting the reagent pack 210 and the cassette 230, then transfer of reagent from the reagent pack 210 to the cassette 230 may be performed by manipulating pneumatics as discussed above with respect to FIG. 4.

FIGS. 6-7 are perspective views of components of a modular cassette system, according to various aspects of the current invention. According to FIG. 6, the interface plate 305 includes a plurality of perforating appendages such as, for example, tubes, 320, that may perforate capsules present in a reagent pack and that may include reagent. In some implementations, the interface plate 305 may be made blunt and taller than the sharp tubes 320. These blunt features may allow light manual assembly of the reagent pack against the cassette without breaking the seals into any of the sensitive reagent volumes. Once the system is ready for synthesis to begin, the module clamps the reagent pack and cassette tightly to the front of the module, in the process, breaking through all of the foil barriers. Once this occurs, one may not be allowed to replace the reagent pack, but need to go forward through the process or abort it and start over. According to Fig. 7, the reagent pack 310 may include individual phials, vials, pods, or capsules 315 in which an amount of reagent may be stored. Accordingly, on the surface of the reagent pack 310 that is to be in contact with the cassette 330, the individual capsules 315 in the reagent pack 310 store one or more reagents. Once the reagent pack 310 is inserted in the system 300, the tubes 320 present on a surface of interface plate 305 directly facing the surface of the reagent pack 310, may become actuated by the action of the clamping system, or by an actuation mechanism, and may puncture one or more of the individual capsules 315 in order to allow the transfer of reagent stored in the capsules 315 of the reagent pack 310 to one or more chambers 380 of the cassette 330. According to various aspects, once the reagent pack 310 is punctured and the stored reagents or ingredients are exposed to the transfer channels connecting the reagent pack 310 to the cassette 330, the transfer of reagent from the reagent pack 310 to the cassette 330 may be performed pneumatically as discussed above with respect to FIG. 2.

FIG. 6 also illustrates the cassette 330 having a plurality of chambers 380, where the chambers 380 are connected to each other via channels formed within the cassette 330, and where any individual chamber 380 may be independently used as a reaction vessel. It should be noted that the channels connecting any two chambers 380 may connect the bottom of the first chamber 380 to the top of the second chamber 380 in order to permit the pneumatically activated reagent transfer from the first chamber 380 to the second chamber 380. With respect to FIG. 7, and according to various aspects, the phials or capsules 315 may be configured to be individual removable units that can be placed at various locations of the reagent pack 310. Accordingly, a reagent pack 310 may have one or more reagent capsules 315 that contain reagent and that can be placed at different locations of the reagent pack 310, according to a given need. For example, specific locations of the capsules 315 may correspond to a configuration where the reagent present in the capsule 315 is transferred only to specific chambers 380 of the cassette 330. As such, the system 300 allows for an exhaustive control of the reaction sites within the cassette 330, and may also allow for several reactions to take place independently during a same time period within the same cassette 330.

Figure 8:
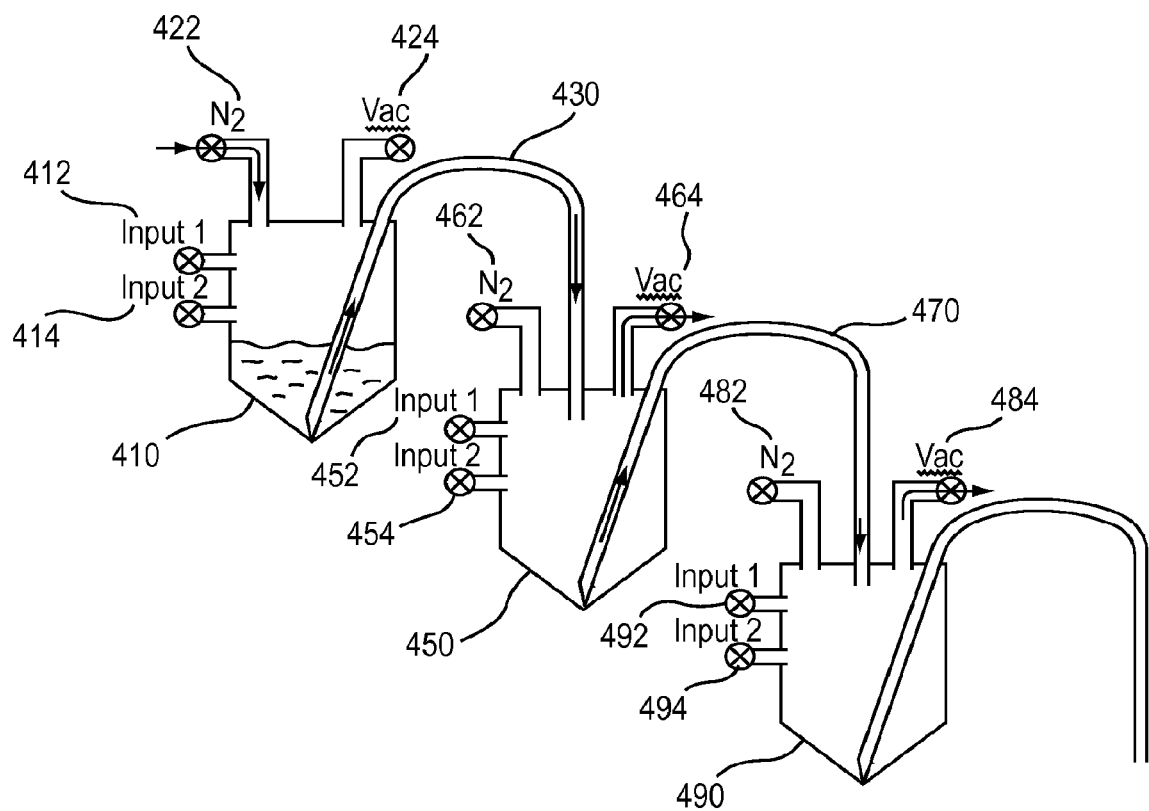
FIG. 8 illustrates a principle of fluid transfer according to various aspects of the current invention.

FIG. 8 illustrates a principle of fluid transfer according to various aspects of the current invention. FIG. 8 is a schematic illustration of a plurality of mixing chambers 410, 450 and 490, wherein the cavity in each chamber may be large enough to allow a two-phase mixture of liquid and vapor, and to establish a fluid level with the vapor located above the fluid. According to various aspects, the chambers 410, 450 and 490 may be reaction chambers of the reaction cassette 130 and/or of the reagent pack 110 discussed above with respect to FIG. 4, and the fluid transfer between the chambers of the reaction cassette 130 and/or of the reagent pack 110 may be controlled according to the above-discussed vacuum and pressure as described below.

According to various aspects, each chamber may have one or more entry and exit passages. For example, the chamber 410 may be a reaction chamber having input lines 412 and 414 to input fluids, reagents and/or other solid, liquid, or gaseous ingredients, to be mixed or reacted together. According to various aspects, the line 422 may be used to provide the chamber 410 with a pressurized gas such as, for example, $N_2$ or any combination of gas or gases other than $N_2$, such one or more inert gas, oxygen or air as long as the gas that does not interact with the fluid composition or ingredients present in the chamber 410 to create an unwanted chemical reaction, by opening a valve at the line 422. A gas referred to as "inert" in this disclosure may be inert with respect to the fluid, ingredients or reagents present in the chamber 410, even without being inert with respect to other compositions or other compounds.

An exemplary purpose of the pressurized gas provided via the line 422 to the chamber 410 is to apply a downward pressure to the fluid present in the chamber 410 and urge the fluid out of the chamber 410 to chamber 450 via the transfer line 430. The chambers 410, 450 and 490 may be configured so as to have an a aunt of space, or distance, between the vacuum lines 424, 464 and 484 and the free surface of the fluid in order to prevent splashing or splattering from causing fluid to be ingested by the vacuum lines and thus to be lost from the process. According to various aspects, baffles may be used to prevent the fluid from being ingested in a vacuum line. The additional amount of space above the free surface of the fluid may also be useful when sparging the fluid to remove any gases dissolved in the fluid.

According to various aspects of the current invention, in order to transfer all of the fluid present in the first chamber 410 to the second chamber 450, the line 422 may be opened to allow a pressurized inert gas to flow into the chamber 410 and to create a pressure urging the fluid downward in the chamber 410 and ultimately out of the chamber 410 via the transfer line 430. In addition, the gas line 462 in the second chamber 450 may be closed, and the vacuum line 464 in the chamber 450 may be opened by opening a vacuum valve located at the line 464. As a result, a vacuum is created in chamber 450, a suction action of the fluid present in the first chamber 410 may be produced through the transfer line 430. Accordingly, the combined action of the pushing action of the pressurized gas flowing in the chamber 410 via the line 422 and of the suction action of the vacuum created in the transfer line 430 and provided via the chamber 450 results in the entirety of the fluid present in the chamber 410 to be transferred rapidly to the chamber 450. According to various aspects, accidental subsequent fluid transfer to chamber 490 from chamber 450 may also be prevented by maintaining a positive pressure inside the chamber 490 and the transfer line 470 by, for example, flowing gas via the gas line 482 into the chamber 490 and possibly in the transfer line 470. As a result of the existence of the positive pressure in chamber 490, no fluid that has been transferred from chamber 410 to chamber 450 can accidentally be further transferred to chamber 490.

It should be noted that during the transfer process, the pressurized gas line 462 of the chamber 450 may remain closed, and no pressurized gas is provided to the chamber 450. However, a pressurized gas may be provided to the chamber 450 via the gas line 462 before any fluid transfer from the chamber 410 to the chamber 450 in order to keep the fluid in the chamber 410 and avoid accidental transfer of fluid via the line 430 before such time when fluid transfer is desired. Accordingly, the pressurized gas is flowed inside chamber 450 via the gas line 462 while the vacuum line 464 is closed. Because the only other opening in the chamber 450 is the transfer line 430, the pressurized gas flows through the transfer line 430 into the fluid present in the chamber 410. As a result, gas sparging or bubbling of the fluid may occur at the end of the transfer line 430 located at the bottom of the chamber 410, which may prevent any amount of fluid from accidentally being transferred from the chamber 410 to the chamber 450. Accordingly, accidental fluid transfer may be avoided, and no fluid is transferred before fluid transfer from chamber 410 to chamber 450 is desired.

According to various aspects of the current invention, the chamber 450 may also have one or more input lines such as input lines 452 and 454, through which additional reagents, or ingredients, may be provided, for example during a second stage of a manufacturing or reaction process, after or before the fluid has been transferred from chamber 410 into chamber 450. Accordingly, mixing of various additional ingredients with the fluid transferred from the chamber 410 to the chamber 450 may take place inside the chamber 450. According to various aspects of the current invention, a subsequent transfer of the fluid now present in chamber 450 to chamber 490 can be accomplished in a similar process to the process described above with respect to the transfer of fluid between chambers 410 and 450. To transfer the fluid from chamber 450 to chamber 490, gas line 462 is opened to allow flow of a pressurized inert gas into chamber 450 while vacuum line 484 of the chamber 490 is opened to create a suction action. As a result, the fluid present in chamber 450 is entirely transferred to the chamber 490 via transfer line 470. In chamber 490, additional ingredients or reactants may be added to the fluid via input lines 492 and 494.

Accordingly, an additional mixture or reaction of various fluids and chemicals may be performed in the successive chambers 410, 450 and 490 during separate successive stages of an overall chemical process, and various effluents or fluids may be transferred to one or more of the chambers by manipulating the vacuum lines and pressure lines of the various chambers as discussed above, and without having to use wet valves or pumps in the transfer lines. For example, chemical synthesis may be performed in the various chambers 410, 450 and 490 illustrated in FIG. 8. It should be noted that although only three chambers are illustrated in FIG. 8, there may be as many chambers as needed to effectuate any required number of reaction steps. According to various aspects, the three chambers 410, 450 and 490 may be reaction chambers of the reaction cassette 130 and/or of the reagent pack 110 discussed with respect to FIG. 4, and the fluid transfer between the chambers of the reaction cassette 130 and/or of the reagent pack 110 may be controlled according to the vacuum and pressure control mechanisms described with respect to FIG. 8.

According to various aspects of the current invention, the above system and operation can be controlled and operated via hardware and software, as discussed in greater detail below.

Figure 9:
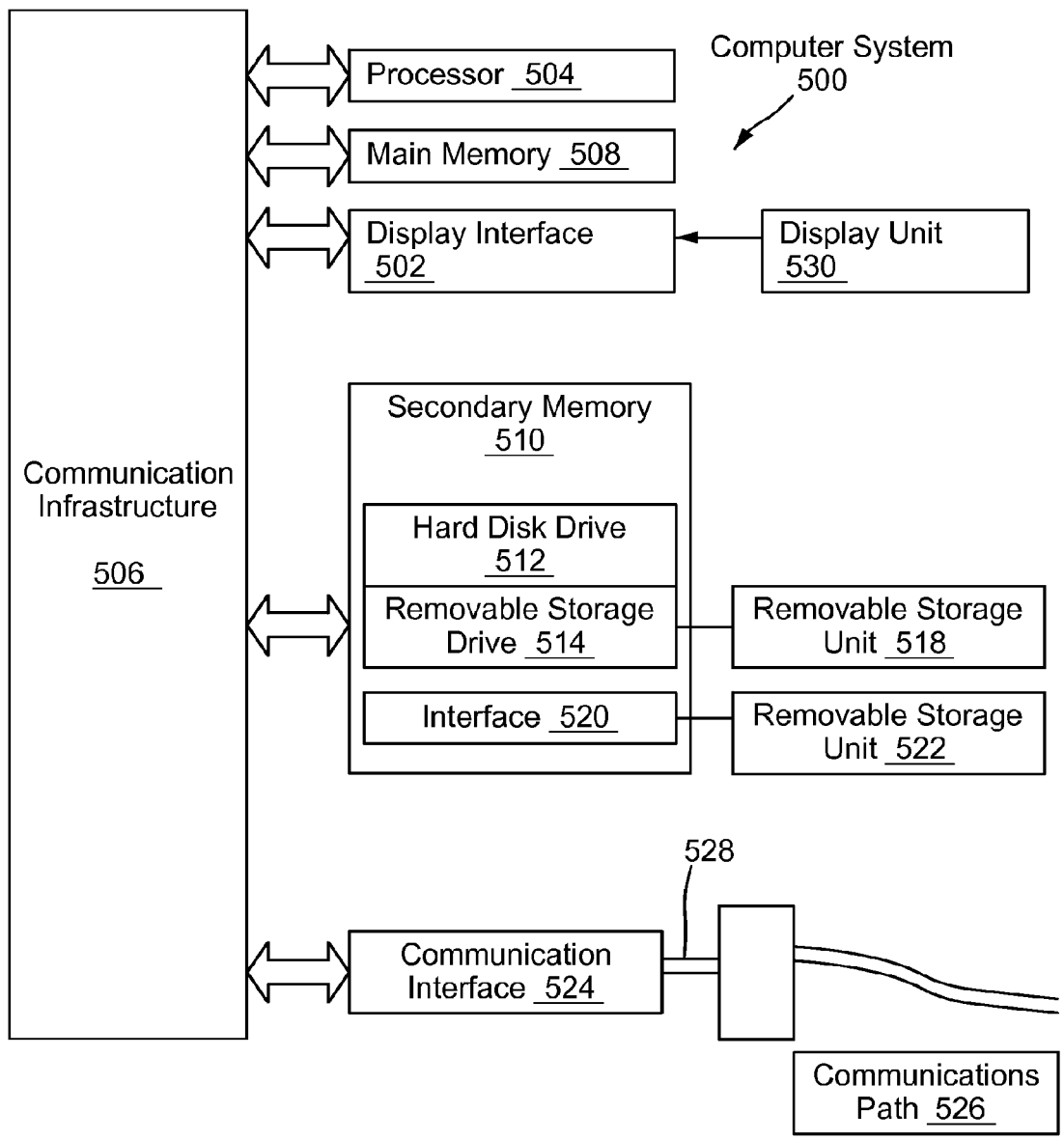
FIG. 9 presents an example system diagram of various hardware components and other features, for use in accordance with an aspect of the present invention.

FIG. 9 presents an example system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 500 is shown in FIG. 9. In some aspects, the computer system 500 may be configured to communicate with the multi-synthesis backplane/bus system discussed above in FIG. 2A.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data. In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transmitted from, e.g., the multi-synthesis backplane/bus system discussed above in FIG. 2A and transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 510 to perform the features of the present invention. Accordingly, such computer programs represent controllers of the computer system 500.

In an aspect where the invention is implemented using software, the software may be stored in a computer program product and loaded into computer system 500 using removable storage drive 514, hard drive 512, or communications interface 520. The control logic (software), when executed by the processor 504, causes the processor 504 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 10:
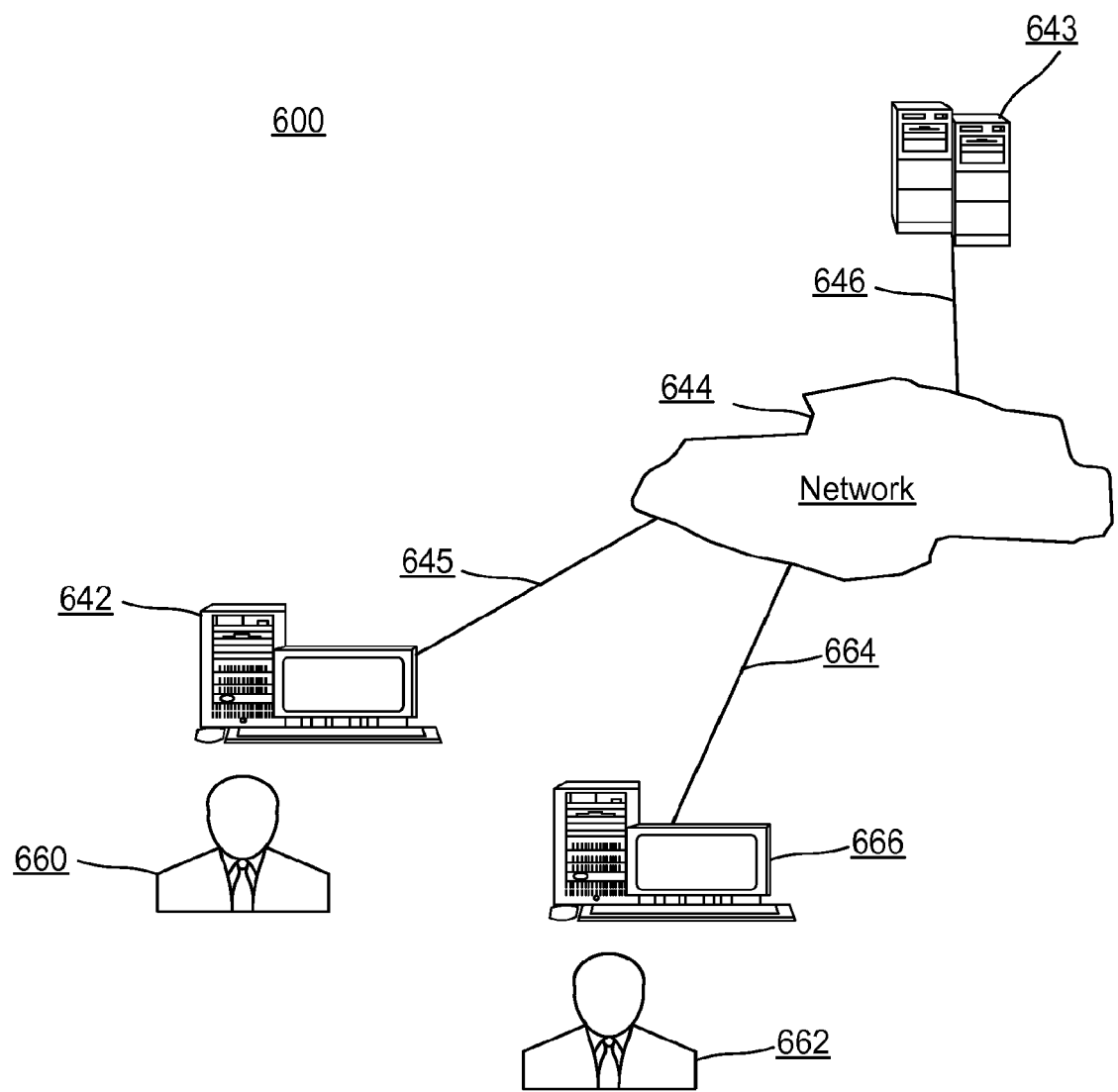
FIG. 10 is a block diagram of various example system components, in accordance with an aspect of the present invention.

FIG. 10 is a block diagram of various example system components, in accordance with an aspect of the present invention. FIG. 10 shows a communication system 600 usable in accordance with, e.g., the multi-synthesis backplane/bus system discussed above in FIG. 2A, according to an aspect of the present invention. The communication system 600 includes one or more accessors 660, 662 (also referred to interchangeably herein as one or more "users") and one or more terminals 642, 666. In one aspect, data for use in accordance with the present invention is, for example, input and/or accessed by accessors 660, 664 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another aspect, the method and system of the present invention operate in a stand-alone environment, such as on a single terminal.

Figure 11:
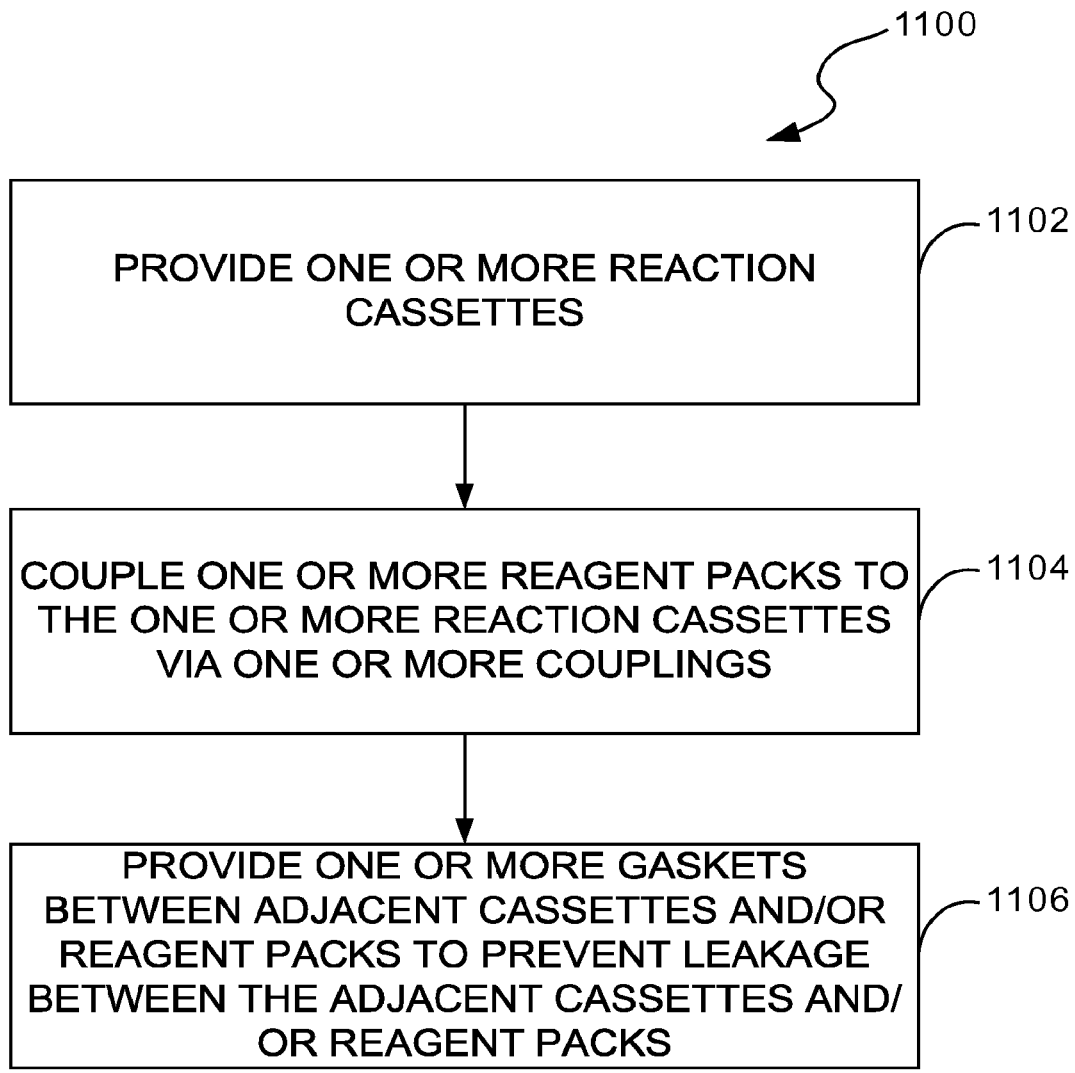
FIG. 11 illustrates a flow diagram for performing a synthesis method in accordance with an aspect of the present invention.

FIG. 11 illustrates a flow diagram for performing a synthesis method 1100 in a modular system, in accordance with an aspect of the present invention. The method includes, among other things, providing 1102 one or more reaction cassettes, and coupling 1104 one or more reagent packs to the one or more reaction cassettes via one or more couplings. The method further includes providing 1106 one or more gaskets between adjacent cassettes and/or reagent packs to prevent leakage between the adjacent cassettes and/or reagent packs, wherein the one or more couplings include channels formed in the one or more cassettes, the one or more reagent packs and the one or more gaskets, and the channels are in communication with one another.

While this invention has been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A modular reaction system, comprising:
   one or more reaction cassettes;
   one or more reagent packs coupled to the one or more reaction cassettes via one or more couplings;
   one or more mixing chambers; and
   one or more gaskets between adjacent reaction cassettes and/or reagent packs, the one or more gaskets being configured to prevent leakage between the adjacent reaction cassettes and/or reagent packs; wherein
   the one or more couplings consist of channels formed in the one or more reaction cassettes, the one or more reagent packs and the one or more gaskets, a plurality of the channels being in communication with one another to ensure fluid transfer, and
   the modular reaction system is configured to be releasably coupled to a computer-assisted backplane control system.

2. The modular reaction system of claim 1, wherein fluid transfer between the one or more reaction cassettes and the one or more reagent packs is pneumatically controlled.

3. The modular reaction system of claim 1, wherein each of the one or more reaction cassettes comprises at least one reaction chamber.

4. The modular reaction system of claim 1, wherein each of the one or more reagent packs comprises at least one reagent capsule.

5. The modular reaction system of claim 1, wherein the channels are integrally formed in the one or more reaction cassettes, the one or more reagent packs and the one or more gaskets.

6. The modular reaction system of claim 1, wherein the channels are configured to ensure fluid communication between the one or more reaction cassettes and the one or more reagent packs.

7. The modular reaction system of claim 3, wherein one or more of the channels formed in each of the one or more reaction cassettes are in communication with the at least one reaction chamber.

8. The modular reaction system of claim 4, wherein one or more of the channels formed in each of the one or more reagent packs are in communication with the at least one reagent capsule.

9. The modular reaction system of claim 1, wherein the fluid transfer between the one or more reaction cassettes and the one or more reagent packs is controlled via a control module located outside the modular reaction system.

10. The modular reaction system of claim 1, wherein the one or more reaction cassettes, the one or more reagent packs and the one or more gaskets are maintained in close proximity via a clamping mechanism so as to prevent leakage.

11. The modular reaction system of claim 1, wherein one or more of the reaction cassettes, the reagent packs and the gaskets are at least one of removable and replaceable.

12. The modular reaction system of claim 1, wherein the modular reaction system is slidable relative to the computer-assisted backplane control system via rails.

13. The modular reaction system of claim 1, wherein the computer-assisted backplane control system controls a plurality of modular reaction systems and components via a bus.

14. The modular reaction system of claim 13, wherein the modular reaction system is configured to share controls and utilities associated with the computer-assisted backplane control system with the plurality of modular reaction systems and components.

15. A synthesis method in a modular reaction system, comprising:
providing one or more reaction cassettes;
coupling one or more reagent packs to the one or more reaction cassettes via one or more couplings;
providing one or more mixing chambers;
providing one or more gaskets between adjacent reaction cassettes and/or reagent packs to prevent leakage between the adjacent reaction cassettes and/or reagent packs; and
providing a computer-assisted backplane control system to control the modular reaction system; wherein
the one or more couplings consist of channels formed in the one or more reaction cassettes, the one or more reagent packs and the one or more gaskets, a plurality of the channels being in communication with one another, and
the modular reaction system is configured to be releasably coupled to the computer-assisted backplane control system.

16. The method of claim 15, further comprising transferring fluid between the one or more reagent packs and the one or more reaction cassettes; wherein the fluid transfer is controlled pneumatically.

17. The method of claim 15, wherein:
providing the one or more reaction cassettes comprises providing at least one reaction chamber in each of the one or more reaction cassettes; and
each one of the one or more reagent packs comprises at least one reagent capsule.

18. The method of claim 15, further comprising integrally forming the channels in the one or more reaction cassettes, the one or more reagent packs and the one or more gaskets.

19. The method of claim 17, further comprising configuring the channels to ensure fluid communication between the one or more reaction cassettes and the one or more reagent packs.

20. The method of claim 19, wherein configuring the channels comprises communicating one or more of the channels formed in each of the one or more reaction cassettes with the at least one reaction chamber.

21. The method of claim 19, wherein configuring the channels comprises communicating one or more of the channels formed in each of the one or more reagent packs with the at least one reagent capsule.

22. The method of claim 16, wherein pneumatically transferring the fluid between the one or more reaction cassettes and the one or more reagent packs is controlled via a control module located outside the modular reaction system.

23. The method of claim 15, wherein coupling one or more reagent packs to the one or more reaction cassettes comprises clamping the one or more reagent packs, the one or more gaskets and the one or more reaction cassettes together via a clamping mechanism.

24. The method of claim 15, wherein one or more of the reaction cassettes, the reagent packs and the gaskets are at least one of removable and replaceable.

25. The method of claim 15, wherein the one or more reaction cassettes are automatically ejected into a shielded waste container to minimize personnel exposure once the one or more of the reaction cassettes are spent.

26. The method of claim 15, further comprising robotically installing at least one replacement cassette.

27. The method of claim 15, further comprising providing rails to the modular reaction system such that the modular reaction system is slidable relative to the computer-assisted backplane control system.

28. The method of claim 15, further comprising using the computer-assisted backplane control system to control a plurality of modular reaction systems and components via a bus.

29. The method of claim 28, further comprising configuring the modular reaction system to share controls and utilities associated with the computer-assisted backplane control system with the plurality of modular reaction systems and components.

30. A computer program product comprising a computer usable medium having control logic stored therein for causing a computer to control pneumatic fluid transfer in a modular reaction system, the modular reaction system comprising:
one or more reaction cassettes;
one or more reagent packs coupled to the one or more reaction cassettes via one or more couplings;
one or more mixing chambers; and
one or more gaskets between adjacent reaction cassettes and/or reagent packs, the one or more gaskets being configured to prevent leakage between the adjacent reaction cassettes and/or reagent packs; wherein the one or more couplings consist of channels formed in the one or more reaction cassettes, the one or more reagent packs and the one or more gaskets, a plurality of the channels being in communication with one another to ensure fluid transfer;

wherein the control logic comprises a computer readable program which controls fluid transfer between the one or more reaction cassettes and the one or more reagent packs, and wherein the modular reaction system is configured to be releasably coupled to a computer-assisted backplane control system.

* * * * *